United States Patent
Marjanovic et al.

(10) Patent No.: US 10,442,719 B2
(45) Date of Patent: Oct. 15, 2019

(54) EDGE CHAMFERING METHODS

(71) Applicant: Corning Incorporated, Corning, NY (US)

(72) Inventors: Sasha Marjanovic, Painted Post, NY (US); Albert Roth Nieber, Painted Post, NY (US); Garrett Andrew Piech, Corning, NY (US); Helmut Schillinger, München (DE); Sergio Tsuda, Horseheads, NY (US); Robert Stephen Wagner, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 14/530,410

(22) Filed: Oct. 31, 2014

(65) Prior Publication Data

US 2015/0165548 A1 Jun. 18, 2015

Related U.S. Application Data

(60) Provisional application No. 61/917,213, filed on Dec. 17, 2013, provisional application No. 62/022,885, filed on Jul. 10, 2014.

(51) Int. Cl.
*B23K 26/02* (2014.01)
*B23K 26/08* (2014.01)
(Continued)

(52) U.S. Cl.
CPC .......... *C03B 33/0222* (2013.01); *B23K 26/02* (2013.01); *B23K 26/037* (2015.10);
(Continued)

(58) Field of Classification Search
None
See application file for complete search history.

(56) References Cited

U.S. PATENT DOCUMENTS

| | | | |
|---|---|---|---|
| 1,790,397 | A | 1/1931 | Woods et al. |
| 2,682,134 | A | 6/1954 | Stookey |

(Continued)

FOREIGN PATENT DOCUMENTS

| | | |
|---|---|---|
| CN | 2388062 Y | 7/2000 |
| CN | 1283409 C | 11/2006 |

(Continued)

OTHER PUBLICATIONS

English lanugage machine translation of JP 2006-248885.*
(Continued)

*Primary Examiner* — Jason L Lazorcik
(74) *Attorney, Agent, or Firm* — Russell S. Magaziner

(57) ABSTRACT

Processes of chamfering and/or beveling an edge of a glass or other substrate of arbitrary shape using lasers are described herein. Three general methods to produce chamfers on glass substrates are disclosed. The first method involves cutting the edge with the desired chamfer shape utilizing an ultra-short pulse laser. Treatment with the ultra-short laser may be optionally followed by a $CO_2$ laser for fully automated separation. The second method is based on thermal stress peeling of a sharp edge corner, and it has been demonstrated to work with different combination of an ultrashort pulse and/or $CO_2$ lasers. A third method relies on stresses induced by ion exchange to effect separation of material along a fault line produced by an ultra-short laser to form a chamfered edge of desired shape.

37 Claims, 22 Drawing Sheets

1) Defect line on chamfer side B
Laser at angle

2) Defect line on flat edge
Laser at 0°

3) ) Defect line on chamfer side A
Laser at angle

(51) Int. Cl.
*C03B 33/02* (2006.01)
*C03B 33/08* (2006.01)
*C03B 33/09* (2006.01)
*B23K 26/53* (2014.01)
*B24B 9/10* (2006.01)
*B23K 26/04* (2014.01)
*B23K 26/035* (2014.01)
*B23K 26/361* (2014.01)
*B23K 26/0622* (2014.01)
*B23K 26/362* (2014.01)
*B23K 26/402* (2014.01)
*C03C 21/00* (2006.01)
*B23K 103/00* (2006.01)

(52) U.S. Cl.
CPC .......... *B23K 26/04* (2013.01); *B23K 26/0624* (2015.10); *B23K 26/083* (2013.01); *B23K 26/0869* (2013.01); *B23K 26/361* (2015.10); *B23K 26/362* (2013.01); *B23K 26/402* (2013.01); *B23K 26/53* (2015.10); *B24B 9/10* (2013.01); *C03B 33/082* (2013.01); *C03B 33/091* (2013.01); *C03C 21/002* (2013.01); *B23K 2103/50* (2018.08); *B23K 2103/54* (2018.08); *Y02P 40/57* (2015.11); *Y10T 428/15* (2015.01); *Y10T 428/24777* (2015.01)

(56) References Cited

U.S. PATENT DOCUMENTS

| | | |
|---|---|---|
| 2,749,794 A | 6/1956 | O'Leary |
| 3,647,410 A | 3/1972 | Heaton et al. |
| 3,695,497 A | 10/1972 | Dear |
| 3,695,498 A | 10/1972 | Dear |
| 3,729,302 A | 4/1973 | Heaton |
| 3,775,084 A | 11/1973 | Heaton |
| 4,226,607 A | 10/1980 | Domken |
| 4,441,008 A | 4/1984 | Chan |
| 4,546,231 A | 10/1985 | Gresser et al. |
| 4,646,308 A | 2/1987 | Kafka et al. |
| 4,764,930 A | 8/1988 | Bille et al. |
| 4,891,054 A | 1/1990 | Bricker et al. |
| 4,907,586 A | 3/1990 | Bille et al. |
| 4,918,751 A | 4/1990 | Pessot et al. |
| 4,929,065 A | 5/1990 | Hagerty et al. |
| 5,035,918 A | 7/1991 | Vyas |
| 5,040,182 A | 8/1991 | Spinelli et al. |
| 5,104,210 A | 4/1992 | Tokas |
| 5,108,857 A | 4/1992 | Kitayama et al. |
| 5,112,722 A | 5/1992 | Tsujino et al. |
| 5,114,834 A | 5/1992 | Nachshon |
| 5,265,107 A | 11/1993 | Delfyett, Jr. |
| 5,400,350 A | 3/1995 | Galvanauskas |
| 5,434,875 A | 7/1995 | Rieger et al. |
| 5,436,925 A | 7/1995 | Lin et al. |
| 5,553,093 A | 9/1996 | Ramaswamy et al. |
| 5,574,597 A | 11/1996 | Kataoka et al. |
| 5,586,138 A | 12/1996 | Yokoyama |
| 5,696,782 A | 12/1997 | Harter et al. |
| 5,736,709 A | 4/1998 | Neiheisel |
| 5,776,220 A | 7/1998 | Allaire et al. |
| 5,854,751 A | 12/1998 | Di Pietro et al. |
| 6,016,223 A | 1/2000 | Suzuki et al. |
| 6,016,324 A | 1/2000 | Rieger et al. |
| 6,038,055 A | 3/2000 | Hänsch et al. |
| 6,055,829 A | 5/2000 | Witzmann et al. |
| 6,078,599 A | 6/2000 | Everage et al. |
| 6,156,030 A | 12/2000 | Neev |
| 6,160,835 A | 12/2000 | Kwon |
| 6,186,384 B1 | 2/2001 | Sawada |
| 6,210,401 B1 | 4/2001 | Lai |
| 6,256,328 B1 | 7/2001 | Delfyett et al. |
| 6,259,151 B1 | 7/2001 | Morrison |
| 6,259,512 B1 | 7/2001 | Mizouchi |
| 6,272,156 B1 | 8/2001 | Reed et al. |
| 6,301,932 B1 | 10/2001 | Allen et al. |
| 6,322,958 B1 | 11/2001 | Hayashi |
| 6,339,208 B1 | 1/2002 | Rockstroh et al. |
| 6,373,565 B1 | 4/2002 | Kafka et al. |
| 6,381,391 B1 | 4/2002 | Islam et al. |
| 6,396,856 B1 | 5/2002 | Sucha et al. |
| 6,407,360 B1 | 6/2002 | Choo et al. |
| 6,438,996 B1 | 8/2002 | Cuvelier |
| 6,445,491 B2 | 9/2002 | Sucha et al. |
| 6,449,301 B1 | 9/2002 | Wu et al. |
| 6,484,052 B1 | 11/2002 | Visuri et al. |
| 6,489,589 B1 | 12/2002 | Alexander |
| 6,501,578 B1 | 12/2002 | Bernstein et al. |
| 6,552,301 B2 | 4/2003 | Herman et al. |
| 6,573,026 B1 | 6/2003 | Aitken et al. |
| 6,592,703 B1 | 7/2003 | Habeck et al. |
| 6,635,849 B1 | 10/2003 | Okawa et al. |
| 6,635,850 B2 | 10/2003 | Amako et al. |
| 6,720,519 B2 | 4/2004 | Liu et al. |
| 6,729,161 B1 | 5/2004 | Miura et al. |
| 6,800,237 B1 | 10/2004 | Yamamoto et al. |
| 6,800,831 B1 | 10/2004 | Hoetzel |
| 6,958,094 B2 | 10/2005 | Ohmi et al. |
| 6,992,026 B2 | 1/2006 | Fukuyo et al. |
| 7,009,138 B2 | 3/2006 | Amako et al. |
| 7,353,829 B1 | 4/2008 | Wachter et al. |
| 7,511,886 B2 | 3/2009 | Schultz et al. |
| 7,535,634 B1 | 5/2009 | Savchenkov et al. |
| 7,633,033 B2 | 12/2009 | Thomas et al. |
| 7,642,483 B2 | 1/2010 | You et al. |
| 7,726,532 B2 | 6/2010 | Gonoe |
| 8,035,882 B2 | 10/2011 | Fanton et al. |
| 8,104,385 B2 | 1/2012 | Hayashi et al. |
| 8,118,971 B2 | 2/2012 | Hori et al. |
| 8,132,427 B2 | 3/2012 | Brown et al. |
| 8,164,818 B2 | 4/2012 | Collins et al. |
| 8,168,514 B2 | 5/2012 | Garner et al. |
| 8,245,539 B2 | 8/2012 | Lu et al. |
| 8,245,540 B2 | 8/2012 | Abramov et al. |
| 8,269,138 B2 | 9/2012 | Garner et al. |
| 8,283,595 B2 | 10/2012 | Fukuyo et al. |
| 8,292,141 B2 | 10/2012 | Cox et al. |
| 8,296,066 B2 | 10/2012 | Zhao et al. |
| 8,327,666 B2 | 12/2012 | Harvey et al. |
| 8,341,976 B2 | 1/2013 | Dejneka et al. |
| 8,347,651 B2 | 1/2013 | Abramov et al. |
| 8,358,888 B2 | 1/2013 | Ramachandran |
| 8,444,906 B2 | 5/2013 | Lee et al. |
| 8,448,471 B2 | 5/2013 | Kumatani et al. |
| 8,518,280 B2 | 8/2013 | Hsu et al. |
| 8,549,881 B2 | 10/2013 | Brown et al. |
| 8,584,354 B2 | 11/2013 | Cornejo et al. |
| 8,584,490 B2 | 11/2013 | Garner et al. |
| 8,592,716 B2 | 11/2013 | Abramov et al. |
| 8,604,380 B2 | 12/2013 | Howerton et al. |
| 8,607,590 B2 | 12/2013 | Glaesemann et al. |
| 8,616,024 B2 | 12/2013 | Cornejo et al. |
| 8,635,887 B2 | 1/2014 | Black et al. |
| 8,680,489 B2 | 3/2014 | Martinez et al. |
| 8,685,838 B2 | 4/2014 | Fukuyo et al. |
| 8,697,228 B2 | 4/2014 | Carre et al. |
| 8,720,228 B2 | 5/2014 | Li |
| 8,826,696 B2 | 9/2014 | Brown et al. |
| 8,847,112 B2 | 9/2014 | Panarello et al. |
| 8,852,698 B2 | 10/2014 | Fukumitsu |
| 8,887,529 B2 | 11/2014 | Lu et al. |
| 8,916,798 B2 | 12/2014 | Plüss |
| 8,943,855 B2 | 2/2015 | Gomez et al. |
| 8,971,053 B2 | 3/2015 | Kariya et al. |
| 9,138,913 B2 | 9/2015 | Arai et al. |
| 9,227,868 B2 | 1/2016 | Matsumoto et al. |
| 9,290,407 B2 | 3/2016 | Barefoot et al. |
| 9,296,066 B2 | 3/2016 | Hosseini et al. |
| 9,324,791 B2 | 4/2016 | Tamemoto |
| 9,327,381 B2 | 5/2016 | Lee et al. |
| 9,341,912 B2 | 5/2016 | Shrivastava et al. |
| 9,446,590 B2 | 9/2016 | Chen et al. |

(56) References Cited

U.S. PATENT DOCUMENTS

| | | |
|---|---|---|
| 9,481,598 B2 | 11/2016 | Bergh et al. |
| 9,703,167 B2 | 7/2017 | Parker et al. |
| 9,873,628 B1 | 1/2018 | Haloui et al. |
| 10,190,363 B2 | 1/2019 | Behmke et al. |
| 2002/0046997 A1 | 4/2002 | Nam et al. |
| 2002/0082466 A1 | 6/2002 | Han |
| 2002/0097486 A1 | 7/2002 | Yamaguchi et al. |
| 2002/0110639 A1 | 8/2002 | Bruns |
| 2003/0006221 A1 | 1/2003 | Hong et al. |
| 2003/0227663 A1 | 12/2003 | Agrawal et al. |
| 2005/0024743 A1 | 2/2005 | Camy-Peyret |
| 2005/0098548 A1 | 5/2005 | Kobayashi et al. |
| 2005/0115938 A1 | 6/2005 | Sawaki et al. |
| 2005/0209898 A1 | 9/2005 | Asai et al. |
| 2005/0274702 A1 | 12/2005 | Deshi |
| 2006/0011593 A1 | 1/2006 | Fukuyo et al. |
| 2006/0109874 A1 | 5/2006 | Shiozaki et al. |
| 2006/0127679 A1 | 6/2006 | Gulati et al. |
| 2006/0227440 A1 | 10/2006 | Gluckstad |
| 2006/0289410 A1 | 12/2006 | Morita et al. |
| 2007/0111390 A1 | 5/2007 | Komura et al. |
| 2007/0111480 A1 | 5/2007 | Maruyama et al. |
| 2007/0119831 A1 | 5/2007 | Kandt |
| 2007/0132977 A1 | 6/2007 | Komatsuda |
| 2007/0138151 A1 | 6/2007 | Tanaka et al. |
| 2007/0177116 A1 | 8/2007 | Amako |
| 2007/0202619 A1 | 8/2007 | Tamura et al. |
| 2007/0298529 A1 | 12/2007 | Maeda et al. |
| 2008/0000884 A1 | 1/2008 | Sugiura et al. |
| 2008/0099444 A1 | 5/2008 | Misawa et al. |
| 2009/0013724 A1 | 1/2009 | Koyo et al. |
| 2009/0032510 A1 | 2/2009 | Ando et al. |
| 2009/0176034 A1 | 7/2009 | Ruuttu et al. |
| 2009/0183764 A1 | 7/2009 | Meyer |
| 2009/0250446 A1 | 10/2009 | Sakamoto |
| 2009/0294419 A1 | 12/2009 | Abramov et al. |
| 2009/0294422 A1 | 12/2009 | Lubatschowski et al. |
| 2009/0323160 A1 | 12/2009 | Egerton et al. |
| 2009/0323162 A1 | 12/2009 | Fanton et al. |
| 2009/0324899 A1 | 12/2009 | Feinstein et al. |
| 2010/0025387 A1 | 2/2010 | Arai et al. |
| 2010/0029460 A1 | 2/2010 | Shojiya et al. |
| 2010/0032087 A1 | 2/2010 | Takahashi et al. |
| 2010/0086741 A1 | 4/2010 | Bovatsek et al. |
| 2010/0089631 A1 | 4/2010 | Sakaguchi et al. |
| 2010/0089882 A1 | 4/2010 | Tamura |
| 2010/0102042 A1 | 4/2010 | Garner et al. |
| 2010/0129603 A1 | 5/2010 | Blick et al. |
| 2010/0147813 A1 | 6/2010 | Lei et al. |
| 2010/0252540 A1 | 10/2010 | Lei et al. |
| 2010/0252959 A1 | 10/2010 | Lei et al. |
| 2010/0276505 A1 | 11/2010 | Smith |
| 2010/0279067 A1 | 11/2010 | Sabia et al. |
| 2010/0287991 A1 | 11/2010 | Brown et al. |
| 2010/0320179 A1 | 12/2010 | Morita et al. |
| 2010/0326138 A1 | 12/2010 | Kumatani et al. |
| 2011/0049765 A1 | 3/2011 | Li et al. |
| 2011/0088324 A1 | 4/2011 | Wessel |
| 2011/0100401 A1 | 5/2011 | Fiorentini |
| 2011/0132881 A1 | 6/2011 | Liu |
| 2011/0183116 A1 | 7/2011 | Hung et al. |
| 2011/0240611 A1 | 10/2011 | Sandström et al. |
| 2011/0277507 A1 | 11/2011 | Lu et al. |
| 2011/0318555 A1 | 12/2011 | Bookbinder et al. |
| 2012/0017642 A1 | 1/2012 | Teranishi et al. |
| 2012/0026573 A1 | 2/2012 | Collins et al. |
| 2012/0047951 A1 | 3/2012 | Dannoux et al. |
| 2012/0048604 A1 | 3/2012 | Cornejo et al. |
| 2012/0061440 A1 | 3/2012 | Roell |
| 2012/0064306 A1 | 3/2012 | Kang et al. |
| 2012/0103018 A1 | 5/2012 | Lu et al. |
| 2012/0131962 A1 | 5/2012 | Mitsugi et al. |
| 2012/0135607 A1 | 5/2012 | Shimoi et al. |
| 2012/0135608 A1 | 5/2012 | Shimoi et al. |
| 2012/0145331 A1 | 6/2012 | Gomez et al. |
| 2012/0196071 A1 | 8/2012 | Cornejo et al. |
| 2012/0214004 A1 | 8/2012 | Hashimoto et al. |
| 2012/0234049 A1 | 9/2012 | Bolton |
| 2012/0234807 A1 | 9/2012 | Sercel et al. |
| 2012/0255935 A1 | 10/2012 | Kakui et al. |
| 2012/0299219 A1 | 11/2012 | Shimoi et al. |
| 2012/0302139 A1 | 11/2012 | Darcangelo et al. |
| 2013/0019637 A1 | 1/2013 | Sol et al. |
| 2013/0034688 A1 | 2/2013 | Koike et al. |
| 2013/0044371 A1 | 2/2013 | Rupp et al. |
| 2013/0068736 A1 | 3/2013 | Mielke et al. |
| 2013/0075480 A1 | 3/2013 | Yokogi et al. |
| 2013/0091897 A1 | 4/2013 | Fugii et al. |
| 2013/0122264 A1 | 5/2013 | Fujii et al. |
| 2013/0126573 A1* | 5/2013 | Hosseini ............ B23K 26/0604 225/2 |
| 2013/0129947 A1 | 5/2013 | Harvey et al. |
| 2013/0133367 A1 | 5/2013 | Abramov et al. |
| 2013/0143416 A1 | 6/2013 | Norval |
| 2013/0149434 A1 | 6/2013 | Oh et al. |
| 2013/0149494 A1 | 6/2013 | Koike et al. |
| 2013/0167590 A1 | 7/2013 | Teranishi et al. |
| 2013/0174607 A1 | 7/2013 | Wootton et al. |
| 2013/0174610 A1 | 7/2013 | Teranishi et al. |
| 2013/0180285 A1 | 7/2013 | Kariya |
| 2013/0189806 A1 | 7/2013 | Hoshino |
| 2013/0192305 A1 | 8/2013 | Black et al. |
| 2013/0209731 A1 | 8/2013 | Nattermann et al. |
| 2013/0220982 A1 | 8/2013 | Thomas et al. |
| 2013/0221053 A1 | 8/2013 | Zhang |
| 2013/0222877 A1 | 8/2013 | Greer et al. |
| 2013/0224439 A1 | 8/2013 | Zhang et al. |
| 2013/0228918 A1 | 9/2013 | Chen et al. |
| 2013/0247615 A1 | 9/2013 | Boek et al. |
| 2013/0266757 A1 | 10/2013 | Giron et al. |
| 2013/0270240 A1 | 10/2013 | Kondo |
| 2013/0280495 A1 | 10/2013 | Matsumoto |
| 2013/0288010 A1 | 10/2013 | Akarapu et al. |
| 2013/0291598 A1 | 11/2013 | Saito et al. |
| 2013/0312460 A1 | 11/2013 | Kunishi et al. |
| 2013/0323469 A1* | 12/2013 | Abramov ............ C03B 33/0222 428/155 |
| 2013/0334185 A1 | 12/2013 | Nomaru |
| 2013/0340480 A1 | 12/2013 | Nattermann et al. |
| 2014/0027951 A1 | 1/2014 | Srinivas et al. |
| 2014/0034730 A1 | 2/2014 | Lee |
| 2014/0042202 A1 | 2/2014 | Lee |
| 2014/0047957 A1 | 2/2014 | Wu |
| 2014/0102146 A1 | 4/2014 | Saito et al. |
| 2014/0110040 A1 | 4/2014 | Cok |
| 2014/0113797 A1 | 4/2014 | Yamada et al. |
| 2014/0133119 A1 | 5/2014 | Kariya et al. |
| 2014/0141192 A1 | 5/2014 | Fernando et al. |
| 2014/0141217 A1 | 5/2014 | Gulati et al. |
| 2014/0147623 A1 | 5/2014 | Shorey et al. |
| 2014/0147624 A1 | 5/2014 | Streltsov et al. |
| 2014/0165652 A1 | 6/2014 | Saito |
| 2014/0174131 A1 | 6/2014 | Saito et al. |
| 2014/0199519 A1 | 7/2014 | Schillinger et al. |
| 2014/0216108 A1 | 8/2014 | Weigel et al. |
| 2014/0239552 A1* | 8/2014 | Srinivas ............ C03B 33/0222 264/5 |
| 2014/0290310 A1 | 10/2014 | Green |
| 2014/0320947 A1 | 10/2014 | Egerton et al. |
| 2014/0333929 A1 | 11/2014 | Sung et al. |
| 2014/0361463 A1 | 12/2014 | DeSimone et al. |
| 2015/0014891 A1 | 1/2015 | Amatucci et al. |
| 2015/0034612 A1* | 2/2015 | Hosseini ............ B23K 26/0648 219/121.61 |
| 2015/0038313 A1 | 2/2015 | Hosseini |
| 2015/0075221 A1 | 3/2015 | Kawaguchi et al. |
| 2015/0075222 A1 | 3/2015 | Mader |
| 2015/0110442 A1 | 4/2015 | Zimmel et al. |
| 2015/0118522 A1 | 4/2015 | Hosseini |
| 2015/0121960 A1* | 5/2015 | Hosseini ............ B28D 5/00 63/32 |
| 2015/0122656 A1* | 5/2015 | Hosseini ............ G01N 27/44756 204/605 |

(56) References Cited

U.S. PATENT DOCUMENTS

| | | | |
|---|---|---|---|
| 2015/0136743 A1* | 5/2015 | Hosseini | B23K 26/364 219/121.61 |
| 2015/0140241 A1 | 5/2015 | Hosseini | |
| 2015/0140735 A1* | 5/2015 | Hosseini | B81C 1/00634 438/107 |
| 2015/0151380 A1 | 6/2015 | Hosseini | |
| 2015/0158120 A1 | 6/2015 | Courvoisier et al. | |
| 2015/0165548 A1 | 6/2015 | Marjanovic et al. | |
| 2015/0165560 A1 | 6/2015 | Hackert et al. | |
| 2015/0165561 A1 | 6/2015 | Le Meur et al. | |
| 2015/0165562 A1 | 6/2015 | Marjanovic et al. | |
| 2015/0165563 A1 | 6/2015 | Manley et al. | |
| 2015/0166391 A1 | 6/2015 | Marjanovic et al. | |
| 2015/0166393 A1 | 6/2015 | Marjanovic et al. | |
| 2015/0166394 A1 | 6/2015 | Marjanovic et al. | |
| 2015/0166395 A1 | 6/2015 | Marjanovic et al. | |
| 2015/0166396 A1 | 6/2015 | Marjanovic et al. | |
| 2015/0166397 A1 | 6/2015 | Marjanovic et al. | |
| 2015/0183679 A1 | 7/2015 | Saito | |
| 2015/0232369 A1 | 8/2015 | Marjanovic et al. | |
| 2015/0299018 A1 | 10/2015 | Bhuyan et al. | |
| 2015/0360991 A1 | 12/2015 | Grundmueller et al. | |
| 2015/0362817 A1 | 12/2015 | Patterson et al. | |
| 2015/0362818 A1 | 12/2015 | Greer | |
| 2015/0367442 A1 | 12/2015 | Bovatsek et al. | |
| 2016/0008927 A1 | 1/2016 | Grundmueller et al. | |
| 2016/0009066 A1* | 1/2016 | Nieber | B23K 26/53 156/272.8 |
| 2016/0023922 A1 | 1/2016 | Addiego et al. | |
| 2016/0031745 A1 | 2/2016 | Ortner et al. | |
| 2016/0060156 A1 | 3/2016 | Krueger et al. | |
| 2016/0097960 A1 | 4/2016 | Dixit et al. | |
| 2016/0138328 A1 | 5/2016 | Behmke et al. | |
| 2016/0168396 A1 | 6/2016 | Letocart et al. | |
| 2016/0280580 A1 | 9/2016 | Bohme | |
| 2016/0290791 A1 | 10/2016 | Buono et al. | |
| 2017/0225996 A1 | 8/2017 | Bookbinder et al. | |
| 2017/0252859 A1 | 9/2017 | Kumkar et al. | |
| 2018/0029919 A1 | 2/2018 | Schnitzler et al. | |
| 2018/0029920 A1 | 2/2018 | Marjanovic et al. | |
| 2018/0062342 A1 | 3/2018 | Comstock, II et al. | |
| 2018/0133837 A1 | 5/2018 | Greenberg et al. | |

FOREIGN PATENT DOCUMENTS

| | | | |
|---|---|---|---|
| CN | 101502914 A | 8/2009 | |
| CN | 201357287 Y | 12/2009 | |
| CN | 101637849 A | 2/2010 | |
| CN | 201471092 U | 5/2010 | |
| CN | 102672355 A | 9/2012 | |
| CN | 102898014 A | 1/2013 | |
| CN | 102923939 A | 2/2013 | |
| CN | 103013374 A | 4/2013 | |
| CN | 103143841 A | 6/2013 | |
| CN | 203021443 U | 6/2013 | |
| CN | 103273195 A | 9/2013 | |
| CN | 103316990 A | 9/2013 | |
| CN | 103359947 A | 10/2013 | |
| CN | 103359948 A | 10/2013 | |
| CN | 103531414 A | 1/2014 | |
| CN | 103746027 A | 4/2014 | |
| CN | 203509350 U | 4/2014 | |
| CN | 104344202 A | 2/2015 | |
| CN | 102672355 B | 5/2015 | |
| DE | 2231330 A1 | 1/1974 | |
| DE | 102006035555 A1 | 1/2008 | |
| DE | 102012010635 A1 | 11/2013 | |
| DE | 102012110971 A1 | 5/2014 | |
| DE | 102013223637 A1 | 5/2015 | |
| EA | 004167 B1 * | 10/2002 | C03B 33/09 |
| EP | 270897 A1 | 2/1992 | |
| EP | 0609978 A1 | 8/1994 | |
| EP | 656241 B1 | 12/1998 | |
| EP | 938946 A1 | 9/1999 | |
| EP | 949541 A2 | 10/1999 | |
| EP | 1159104 B1 | 8/2004 | |
| EP | 1609559 A1 | 12/2005 | |
| EP | 1043110 B1 | 8/2006 | |
| EP | 2133170 A1 | 12/2009 | |
| EP | 2202545 A1 | 6/2010 | |
| EP | 2574983 A1 | 4/2013 | |
| EP | 2754524 B1 | 7/2014 | |
| EP | 2781296 A1 | 9/2014 | |
| EP | 2783784 A2 | 10/2014 | |
| EP | 2859984 A2 | 4/2015 | |
| FR | 2989294 A1 | 10/2013 | |
| GB | 1242172 A | 8/1971 | |
| GB | 2481190 B | 1/2015 | |
| JP | 1179770 A | 7/1989 | |
| JP | 6318756 A | 11/1994 | |
| JP | 1994318756 | 11/1994 | |
| JP | 9106243 A | 4/1997 | |
| JP | 11197498 A | 7/1999 | |
| JP | 1999197498 | 7/1999 | |
| JP | 11269683 A | 10/1999 | |
| JP | 1999269683 | 10/1999 | |
| JP | 11330597 A | 11/1999 | |
| JP | 1999330597 | 11/1999 | |
| JP | 11347758 A | 12/1999 | |
| JP | 1999347758 | 12/1999 | |
| JP | 2001138083 A | 5/2001 | |
| JP | 2002210730 A | 7/2002 | |
| JP | 2002228818 A | 8/2002 | |
| JP | 2003025085 A | 1/2003 | |
| JP | 2003114400 A | 4/2003 | |
| JP | 2003154517 A | 5/2003 | |
| JP | 2003181668 A | 7/2003 | |
| JP | 2003238178 A | 8/2003 | |
| JP | 2004209675 A | 7/2004 | |
| JP | 2005104819 A | 4/2005 | |
| JP | 2005205440 A | 8/2005 | |
| JP | 2005288503 | 10/2005 | |
| JP | 2005288503 A | 10/2005 | |
| JP | 3775250 B2 | 5/2006 | |
| JP | 3775410 B2 | 5/2006 | |
| JP | 2006130691 A | 5/2006 | |
| JP | 2006248885 | 9/2006 | |
| JP | 2006248885 A | 9/2006 | |
| JP | 2007021548 A | 2/2007 | |
| JP | 2007196277 A | 8/2007 | |
| JP | 2007253203 A | 10/2007 | |
| JP | 2008018547 A | 1/2008 | |
| JP | 2009056482 A | 3/2009 | |
| JP | 4592855 B2 | 12/2010 | |
| JP | 2011049398 A | 3/2011 | |
| JP | 4672689 B2 | 4/2011 | |
| JP | 2011517299 A | 6/2011 | |
| JP | 4880820 B2 | 2/2012 | |
| JP | 2012024782 A | 2/2012 | |
| JP | 2012031018 A | 2/2012 | |
| JP | 2012159749 A | 8/2012 | |
| JP | 2013007842 A | 1/2013 | |
| JP | 2013043808 A | 3/2013 | |
| JP | 2013075802 A | 4/2013 | |
| JP | 2013091578 A | 5/2013 | |
| JP | 2013136075 A | 7/2013 | |
| JP | 5274085 B2 | 8/2013 | |
| JP | 5300544 B2 | 9/2013 | |
| JP | 2013187247 A | 9/2013 | |
| JP | 2013203630 A | 10/2013 | |
| JP | 2013203631 A | 10/2013 | |
| JP | 2013223886 A | 10/2013 | |
| KR | 2012015366 | 2/2002 | |
| KR | 2009057161 | 6/2009 | |
| KR | 1020621 | 3/2011 | |
| KR | 1120471 B1 | 3/2012 | |
| KR | 2012074508 | 7/2012 | |
| KR | 2013031380 | 3/2013 | |
| KR | 1269474 | 5/2013 | |
| KR | 2013124646 | 11/2013 | |
| KR | 1344368 | 12/2013 | |
| KR | 2014022980 | 2/2014 | |
| KR | 2014022981 | 2/2014 | |

(56) References Cited

FOREIGN PATENT DOCUMENTS

| KR | 2014064220 | | 5/2014 | |
|---|---|---|---|---|
| TW | 201226345 | | 7/2012 | |
| WO | 1999029243 | A1 | 7/1999 | |
| WO | 1999063900 | A1 | 12/1999 | |
| WO | 2004110693 | A1 | 12/2004 | |
| WO | 2006073098 | A1 | 7/2006 | |
| WO | 2007094160 | A1 | 8/2007 | |
| WO | 2008080182 | A1 | 7/2008 | |
| WO | 2008108332 | A1 | 9/2008 | |
| WO | 2008128612 | A1 | 10/2008 | |
| WO | 2009114375 | A2 | 9/2009 | |
| WO | 2010035736 | A1 | 4/2010 | |
| WO | 2010111609 | A2 | 9/2010 | |
| WO | 2010129459 | A2 | 11/2010 | |
| WO | 2011025908 | A1 | 3/2011 | |
| WO | 2011056781 | A1 | 5/2011 | |
| WO | 2012006736 | A2 | 1/2012 | |
| WO | 2012075072 | A2 | 6/2012 | |
| WO | 2012166753 | A2 | 6/2012 | |
| WO | 2012108052 | A1 | 8/2012 | |
| WO | 2012166753 | A1 | 12/2012 | |
| WO | 2013022148 | A1 | 2/2013 | |
| WO | 2013043173 | A1 | 3/2013 | |
| WO | 2013138802 | A1 | 9/2013 | |
| WO | 2013150990 | A1 | 10/2013 | |
| WO | 2013153195 | A1 | 10/2013 | |
| WO | 2014028022 | A1 | 2/2014 | |
| WO | 2014/079478 | | 5/2014 | |
| WO | 2014/079570 | | 5/2014 | |
| WO | 2014064492 | A1 | 5/2014 | |
| WO | 2014079478 | A1 | 5/2014 | |
| WO | 2014079570 | A1 | 5/2014 | |
| WO | WO 2014079570 | A1 * | 5/2014 | ......... B23K 26/0057 |
| WO | 2014085663 | A1 | 6/2014 | |
| WO | 2014111385 | A1 | 7/2014 | |
| WO | 2014111794 | A1 | 7/2014 | |
| WO | 2014161534 | A2 | 10/2014 | |
| WO | 2014161535 | A2 | 10/2014 | |
| WO | 2015077113 | A1 | 5/2015 | |
| WO | 2015095088 | A1 | 6/2015 | |
| WO | 2015095090 | A1 | 6/2015 | |
| WO | 2015095146 | A1 | 6/2015 | |
| WO | 2015127583 | A1 | 9/2015 | |
| WO | 2016010954 | A2 | 1/2016 | |
| WO | 2017091529 | A1 | 6/2017 | |

OTHER PUBLICATIONS

English language translation of JP 2006-248885.*
Machine Translation of EA004167B1—Translate.google.com accessed Oct. 13, 2017.*
Duocastella (Duocastella, M., Arnold, C., "Bessel and annular beams for materials processing", Laser Photonics Rev. 6, n. 5, 607-621 (2012)).*
Polesana (Polesana, P., Dubietis, A., Porras, A. Kucinskas, E. Faccio, D. Couairon, A. and DiTrapani, P.,, "Near-field dynamics of ultrashort pulsed Bessel beams in media with Kerr nonlinearity", Physical Review E 73, 056612 (2006)).*
Invitation to pay additional fees, issued in connection with corresponding PCT application No. PCT/US2014/070431, Dec. 16, 2014, dated Apr. 20, 2015.
Bagchi, "Fast Ion Beams From Intense, Femtosecond Laser Irradiated Nanostructured Surfaces." Appl. Phys. B88: 167-173(2007).
Bhuyan, "Laser micro and nanostructuring using femtosecond Bessel beams." Eur. Phys. J Special Topics 199: 101-110 (2011).
Bhuyan. "Ultrafast Bessel beams for high aspect ratio taper free micromachining of glass." Nonlinear Optics and Applications IV, Proc of SPIE vol. 7728:7228IV-1-7228IV-8 (2010.).
Bhuyan, "Single-shot high aspect ratio bulk nanostructuring of fused silica using chirp-controlled ultrafast laser Bessel beams." Applied Physics Letters 10-4, 021107-1-021107-4 (2014).
Courvoisier, "Applications of femtosecond Bessel beams to laser ablation." Appl Phys A, 112:29-34, (2013).
Courvoisier, "Surface nanoprocessing with nondiffracting femtosecond Bessel beams." Optics Letters, vol. 34, No. 20, 3163-3165, Oct. 15, 2009.
Stoian, "Spatial and temporal laser pulse design for material processing on ultrafast scales." Appl. Phys. A, 114:119-127, (2014).
Velpula, "Ultrafast imaging of free carriers: controlled excitation with chirped ultrafast laser Bessel beams." Prof of SPIE vol. 8967, 896711-1-896711-8, (2014.).
http://www.gtat.com/Collateral/Documents/English-US/Sapphire/12-21-12_GT_TouchScreen_V3_web.pdf.
E. Vanagas et al., "Glass Cutting by Femtosecond Pulsed Radiation", J. Microlith., Microfa., Microsyst., 3(2) 358-363, 2004.
M. K. Bhuyan, et al., High aspect ratio taper-free microchannel fabrication using femtosecond Bessel beams, Jan. 18, 2010 / vol. 18, No. 2 / Optics Express 566.
Design of Diffractivephase Axicon Illuminated by a Gaussian-Profile Beam, Zhangg Uo-Qing, D Ongb I-Zhen,Y Angg Uo-Zhen, and Gu Ben-Yuan, vol. 6, No. 5 Acta Physica Sinica May, 1996, pp. 354.
High-resolution optical coherence tomography over a large depth range with an axicon lens, Zhihua Ding, Hongwu Ren, Yonghua Zhao, J. Stuart Nelson, and Zhongping Chen, Feb. 15, 2002 / vol. 27, No. 4 / Optics Letters 243.
Ilya Golub, Fresnel axicon, 1890 Optics Letters / vol. 31, No. 12 / Jun. 15, 2006.
M. K. Bhuyan, et al., High aspect ratio nanochannel machining using single shot femtosecond Bessel beams, Appl. Phys. Lett. 97, 081102 (2010).
Rieko Arimoto, et al., Imaging properties of axicon in a scanning optical system; Nov. 1, 1992 / vol. 31, No. 31 / Applied Optics 6653.
D. Zeng, et al., Characteristic analysis of a refractive axicon system for optical trepanning; Optical Engineering 45(9), 094302 Sep. 2006.
Pavel Polynkin, et al., Extended filamentation with temporally chirped femtosecond Bessel-Gauss beams in air, Jan. 19, 2009 / vol. 17, No. 2 / Optics Express 575.
O.G. Kosareva, et al. Formation of extended plasma channels in a condensed medium upon axicon focusing of a femtosecond laser pulse, Quantum Electronics, 35(11), 1013-1014 (2005).
Kruger, et al., "Laser micromachining of barium aluminum borosilicate glass with pulse durations between 20 fs and 3 ps,", Applied Surface Science, 127-129(1998), 892-898.
Perry, et al., "Ultrashort-Pulse Laser Machining," submitted to ICA of Lasers and Electro-Optics, Preprint Nov. 16-19, 1998, Pub. Jan. 22, 1999, International Congress on Applications of Lasers and Electro-Optics.
Herman, et al., "Laser Micromachining of 'transparent' fused silica with 1ps pulses and pulse trains", SPIE Conference, San Jose, CA, Jan. 1999, vol. 3616-0277-786X/99.
Yoshino, et al., "Micromachining with a High Repetition Rate Femtosecond Fiber Laser," Journal of laser Micro/Nanoengineering vol. 3, No. 3, 2008.
Abramov et al., "Laser separation of chemically strengthened glass", Physics Procedia, 5 (2010), 285-290.
International Search Report, issued in connection with corresponding PCT application No. PCT/US2014/070431, dated Aug. 10, 2015.
Abramov et al., "Laser separation of chemically strengthened glass"; Physics Procedia 5 (2010) 285-290, Elsevier.; doi: 10.1016/j.phpro.2010.08.054.
Arimoto et al., "Imaging properties of axicon in a scanning optical system"; Applied Optics, Nov. 1, 1992, vol. 31, No. 31, pp. 6653-6657.
"TruMicro 5000" Product Manual, Trumpf Laser GmbH + Co. KG, pp. 1-4, Aug. 2011.
Bhuyan et al., "High aspect ratio nanochannel machining using single shot femtosecond Bessel beams"; Applied Physics Letters 97, 081102 (2010); doi: 10.1063/1.3479419.
Bhuyan et al., "High aspect ratio taper-free microchannel fabrication using femtosecond Bessel beams"; Optics Express (2010) vol. 18, No. 2, pp. 566-574.
Cubeddu et al., "A compact time-resolved reflectance system for dual-wavelength multichannel assessment of tissue absorption and

(56) References Cited

OTHER PUBLICATIONS scattering"; Part of the SPIE Conference on Optical Tomography and Spectroscopy of Tissue III, San Jose, CA (Jan. 1999), SPIE vol. 3597, 0277-786X/99, pp. 450-455.

Cubeddu et al., "Compact tissue oximeter based on dual-wavelength multichannel time-resolved reflectance"; Applied Optics, vol. 38, No. 16, Jun. 1, 1999, pp. 3670-3680.

Ding et al., "High-resolution optical coherence tomography over a large depth range with an axicon lens"; Optic Letters, vol. 27, No. 4, pp. 243-245, Feb. 15, 2002, Optical Society of America.

"EagleEtch" Product Brochure, EuropeTec USA Inc., pp. 1-8, Aug. 1, 2014.

Girkin et al., "Macroscopic multiphoton biomedical imaging using semiconductor saturable Bragg reflector modelocked Lasers"; Part of the SPIE Conference on Commercial and Biomedical Applications of Ultrafast Lasers, San Jose, CA (Jan. 1999), SPIE vol. 3616, 0277-786X/99, pp. 92-98.

Glezer et al., "Ultrafast-laser driven micro-explosions in transparent materials"; Applied Physics Letters, vol. 71 (1997), pp. 882-884.

Golub, I., "Fresnel axicon"; Optic Letters, vol. 31, No. 12, Jun. 15, 2006, Optical Society of America, pp. 1890-1892.

Herman et al., "Laser micromachining of 'transparent' fused silica with 1-ps pulses and pulse trains"; Part of the SPIE Conference on Commercial and Biomedical Applications of Ultrafast Lasers, San Jose, CA (Jan. 1999), SPIE vol. 3616, 0277-786X/99, pp. 148-155.

Kosareva et al., "Formation of extended plasma channels in a condensed medium upon axicon focusing of a femtosecond laser pulse"; Quantum Electronics 35 (11) 1013-1014 (2005), Kvantovaya Elektronika and Turpion Ltd.; doi: 10.1070/QE2005v035n11ABEH013031.

Krüger et al., "Femtosecond-pulse visible laser processing of transparent materials"; Applied Surface Science 96-98 (1996) 430-438.

Krüger et al., "Laser micromachining of barium aluminium borosilicate glass with pluse durations between 20 fs and 3 ps"; Applied Surface Science 127-129 (1998) 892-898.

Krüger et al., "Structuring of dielectric and metallic materials with ultrashort laser pulses between 20 fs and 3 ps"; SPIE vol. 2991, 0277-786X/97, pp. 40-47.

Lapczyna et al., "Ultra high repetition rate (133 MHz) laser ablation of aluminum with 1.2-ps. pulses"; Applied Physics A 69 [Suppl.], S883-S886, Springer-Verlag (1999); doi: 10.1007/s003399900300.

Perry et al., "Ultrashort-pulse laser machining"; UCRL-JC-132159 Rev 1., Jan. 22, 1999, pp. 1-24.

Perry et al., "Ultrashort-pulse laser machining"; UCRL-ID-132159, Sep. 1998, pp. 1-38.

Perry et al., "Ultrashort-pulse laser machining of dielectric materials"; Journal of Applied Physics, vol. 85, No. 9, May 1, 1999, American Institute of Physics, pp. 6803-6810.

"Pharos High-power femtosecond laser system" product brochure; Light Conversion, Vilnius, LT; Apr. 18, 2011, pp. 1-2.

Polynkin et al., "Extended filamentation with temporally chirped femtosecond Bessel-Gauss beams in air"; Optics Express, vol. 17, No. 2, Jan. 19, 2009, OSA, pp. 575-584.

Serafetinides et al., "Ultra-short pulsed laser ablation of polymers"; Applied Surface Science 180 (2001) 42-56.

Sundaram et al., "Inducing and probing non-thermal transitions in semiconductors using femtosecond laser pulses"; Nature Miracles, vol. 1, Dec. 2002, Nature Publishing Group (2002), pp. 217-224.

Vanagas et al., "Glass cutting by femtosecond pulsed irradiation"; J. Micro/Nanolith. MEMS MOEMS. 3(2), 358-363 (Apr. 1, 2004); doi: 10.1117/1.1668274.

Varel et al., "Micromachining of quartz with ultrashort laser pulses"; Applied Physics A 65, 367-373, Springer-Verlag (1997).

Yoshino et al., "Micromachining with a high repetition rate femtosecond fiber laser"; JLMN—Journal of Laser Micro/Nanoengineering vol. 3, No. 3 (2008), pp. 157-162.

Zeng et al. "Characteristic analysis of a refractive axicon system for optical trepanning"; Optical Engineering 45(9), 094302 (Sep. 2006), pp. 094302-1-094302-10.

Zhang et al., "Design of diffractive-phase axicon illuminated by a Gaussian-profile beam"; Acta Physica Sinica (overseas edition), vol. 5, No. 5 (May 1996) Chin. Phys. Soc., 1004-423X/96/05050354-11, pp. 354-364.

Abakians, H. et al.; Evaporative Cutting of a Semitransparent Body With a Moving CW Laser; Journal of Heat Transfer; Nov. 1988; pp. 924-930; vol. 110; ASME.

Ahmed, F. et al.; Display glass cutting by femtosecond laser induced single shot periodic void array; Applied Physics A Material Science & Processing; Jun. 3, 2008; pp. 189-192; vol. 93; Springer-Verlag.

Bagchi, S. et al.; Fast ion beams from intense, femtosecond laser irradiated nanostructured surfaces; Applied Physics B Lasers and Optics; Jun. 27, 2007; pp. 167-173; vol. 88; Springer-Verlag.

Bhuyan, M.K. et al.; Femtosecond non-diffracting Bessel beams and controlled nanoscale ablation; ResearchGate Conference Paper; Sep. 2011; pp. 1-4.

Bhuyan, M.K. et al.; Laser micro- and nanostructuring using femtosecond Bessel beams; The European Physical Journal Special Topics; Dec. 7, 2011; pp. 101-110; vol. 1999; EDP Sciences, Springer-Verlag.

Bhuyan, M.K. et al.; Single-shot high aspect ratio bulk nanostructuring of fused silica using chirp-controlled ultrafast laser Bessel beams; Applied Physics Letters; Jan. 14, 2014; pp. 021107-1-021107-4; vol. 104; AIP Publishing LLC.

Bhuyan, M.K. et al.; Ultrafast Bessel beams for high aspect ratio taper free micromachining of glass; Nonlinear Optics and Applications IV; 2010; pp. 77281V-1-77281V-8; vol. 7728; SPIE.

Case Design Guidelines for Apple Devices; Sep. 13, 2013; pp. 1-58; Apple Inc.

Chiao, R. Y. et al.; Self-Trapping of Optical Beams; Physical Review Letters; Oct. 12, 1964; pp. 479-482; vol. 13, No. 15.

Corning EAGLE AMLCD Glass Substrates Material Information; Apr. 2005; pp. MIE 201-1-MIE 201-3; Corning Incorporated.

Corning 1737 AMLCD Glass Substrates Material Information; Aug. 2002; pp. MIE 101-1-MIE 101-3; Corning Incorporated.

Couairon, A. et al.; Femtosecond filamentation in transparent media; ScienceDirect Physical Reports; Feb. 6, 2007; pp. 47-189; vol. 441; Elsevier B.V.

Courvoisier, F. et al.; Applications of femtosecond Bessel beams to laser ablation; Applied Physics A Materials Science & Processing; Sep. 6, 2012; pp. 29-34; vol. 112; Springer-Verlag.

Courvoisier, F. et al.; Surface nanoprocessing with nondiffracting femtosecond Bessel beams; Optics Letters; Oct. 15, 2009; pp. 3163-3165; vol. 34, No. 20; Optical Society of America.

Dong, M. et al.; On-axis irradiance distribution of axicons illuminated by spherical wave; ScienceDirect Optics & Laser Technology; Sep. 2007; pp. 1258-1261; vol. 39; Elsevier Ltd.

Duocastella, M. et al.; Bessel and annular beams for materials processing; Laser & Photonics Reviews; 2012; pp. 607-621; vol. 6, No. 5.

Durnin, J.; Exact solutions for nondiffracting beams. I. The scalar theory; J. Opt. Soc. Am. A; Apr. 1987; pp. 651-654; vol. 4, No. 4; Optical Society of America.

Eaton, S. et al.; Heat accumulation effects in femtosecond laser-written waveguides with variable repetition rate; Optics Express; Jun. 13, 2005; pp. 4708-4716; vol. 13, No. 12; Optical Society of America.

Gattass, R. et al.; Micromachining of bulk glass with bursts of femtosecond laser pulses at variable repetition rates; Optics Express; Jun. 12, 2006; pp. 5279-5284; vol. 14, No. 12; Optical Society of America.

Gori, F. et al.; Analytical derivation of the optimum triplicator; Optics Communications; Dec. 1, 1998; pp. 13-16; vol. 157; Elsevier B.V.

Honda, M. et al.; A Novel Polymer Film that Controls Light Transmission; Progress in Pacific Polymer Science 3; 1994; pp. 159-169; Springer-Verlag Berlin Heidelberg.

Hu, Z. et al.; 5-Axis Laser Culling Interference Detection and Correction Based on STL Model; Chinese Journal of Lasers; Dec. 2009; pp. 3313-3317; vol. 36, No. 12.

Huang, Z. et al.; Laser etching of glass substrates by 1064 nm laser irradiation; Applied Physics A Materials Science & Processing; Jun. 6, 2008; pp. 159-163; vol. 93; Springer-Verlag.

(56) References Cited

OTHER PUBLICATIONS

Juodkazis, S. et al.; Laser-Induced Microexplosion Confined in the Bulk of a Sapphire Crystal: Evidence of Multimegabar Pressures; Physical Review Letters; Apr. 28, 2006; pp. 166101-1-166101-4; vol. 96; The American Physical Society.
Karlsson, S. et al.; The Technology of Chemical Glass Strengthening—A Review; Glass Technology—European Journal of Glass Science and Technology Part A; Apr. 2010; pp. 41-54; vol. 51, No. 2.
Levy, U. et al.; Design, fabrication, and characterization of circular Dammann gratings based on grayscale lithography; Optics Letters; Mar. 15, 2010; pp. 880-882; vol. 35, No. 6; Optical Society of America.
Liu, X. et al.; Laser Ablation and Micromachining with Ultrashort Laser Pulses; IEEE Journal of Quantum Electronics; Oct. 1997; p. 1706-1716; vol. 33, No. 10; IEEE.
Maeda, K. et al.; Optical performance of angle dependent light control glass; Optical Materials Technology for Energy Efficiency and Solar Energy Conversion X; 1991; pp. 138-148; vol. 1536; SPIE.
Mbise, G. et al.; Angular selective window coatings; theory and experiments; J. Phys. D: Appl. Phys.; 1997; pp. 2103-2122; vol. 30; IOP Publishing Ltd.
McGloin, D. et al.; Bessel beams: diffraction in a new light; Contemporary Physics; Jan.-Feb. 2005; pp. 15-28; vol. 46; Taylor & Francis Ltd.
Merola, F. et al.; Characterization of Bessel beams generated by polymeric microaxicons; Measurement Science and Technology; May 15, 2012; pp. 1-10; vol. 23; IOP Publishing Ltd.
Mirkhalaf, M. et al.; Overcoming the brittleness of glass through bio-inspiration and micro-architecture; Nature Communications; Jan. 28, 2014; pp. 1-9; Macmillan Publishers Limited.
Romero, L. et al.; Theory of optimal beam splitting by phase gratings. II. Square and hexagonal gratings; J. Opt. Soc. Am. A; Aug. 2007; pp. 2296-2312; vol. 24, No. 8; Optical Society of America.
Salleo, A. et al.; Machining of transparent materials using an IR and UV nanosecond pulsed laser; Applied Physics A Materials Science & Processing; Sep. 20, 2000; pp. 601-608; vol. 71; Springer-Verlag.
Serafetinides, A. et al.; Polymer Ablation by Ultra-Short Pulsed Lasers; Proceedings of SPIE; 2000; pp. 409-415.
Shah, L. et al.; Micromachining with a High Repetition Rate Femtosecond Fiber Laser; JLMN—Journal of Laser Micro/Nanoengineering; Nov. 2008; pp. 157-162; vol. 3, No. 3.
Shealy, D. et al.; Geometric optics-based design of laser beam shapers; Opt. Eng.; Nov. 2003; pp. 3123-3138; vol. 42, No. 11; Society of Photo-Optical Instrumentation Engineers.
Stoian, R. et al.; Spatial and temporal laser pulse design for material processing on ultrafast scales; Applied Physics A Materials Science & Processing; Jan. 1, 2014; pp. 119-127; vol. 114; Springer-Verlag Berlin Heidelberg.
Thiele, E.; Relation between Catalytic Activity and Size of Particle; Industrial and Engineering Chemistry; Jul. 1939; pp. 916-920; vol. 31, No. 7.
Toytman, I. et al.; Optical breakdown in transparent media with adjustable axial length and location; Optic Express; Nov. 22, 2010; pp. 24688-24698; vol. 18, No. 24; Optical Society of America.
Velpula, P. et al.; Ultrafast imaging of free carriers: controlled excitation with chirped ultrafast laser Bessel beams; Laser Applications in Microelectronic and Optoelectronic Manufacturing (LAMOM) XIX; Proc. of SPIE; 2014; pp. 896711-1-896711-8; vol. 8967; SPIE.
Wang, Z. et al.; Investigation on CO2 laser irradiation inducing glass strip peeling for microchannel formation; Biomicrofluidics; Mar. 12, 2012; pp. 012820-1-012820-12; vol. 6; American Institute of Physics.
Ra & RMS: Calculating Surface Roughness; Harrison Eelectropolishing; 2012.
Wu, W. et al.; Optimal Orientation of the Cutting Head for Enhancing Smoothness Movement in Three-Dimensional Laser Cutting; Chinese Journal of Lasers; Jan. 2013; pp. 0103005-1-0103005-7, vol. 10, No. 1.
GT ASF Grown Sapphire Cover and Touch Screen Material; www.gtat.com; 2012; pp. 1-2; GTAT Corporation.
Xu, H. et al.; Optimization of 3D laser cutting head orientation based on minimum energy consumption; Int J Adv Manuf Technol; Jun. 28, 2014; pp. 1283-1291; vol. 74; Springer-Verlag London.
Yan, Y. et al.; Fiber structure to convert a Gaussian beam to higher-order optical orbital angular momentum modes; Optics Letters; Aug. 15, 2012; pp. 3294-3296; vol. 37, No. 16; Optical Society of America.
English Translation of JP2016540525 Office Action dated Oct. 3, 2018; 5 Pages; Japanese Patent Office.

\* cited by examiner

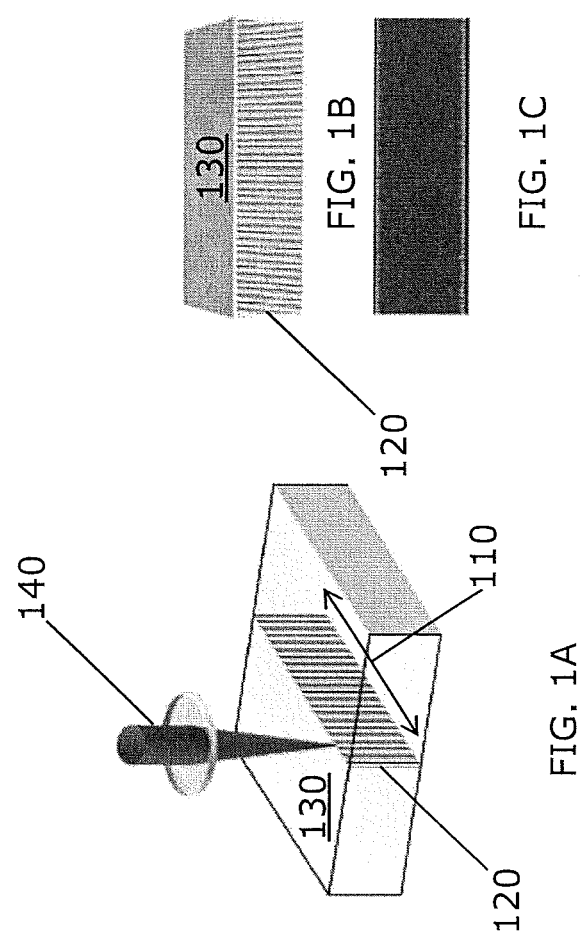

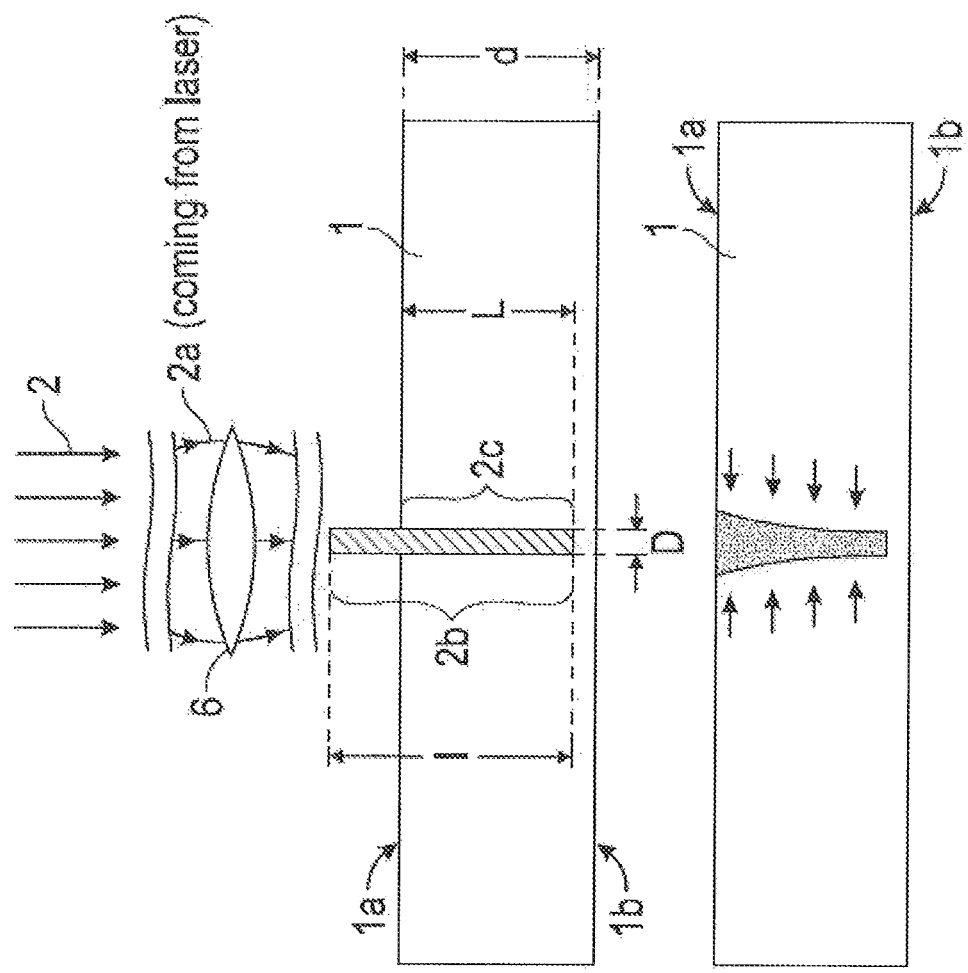

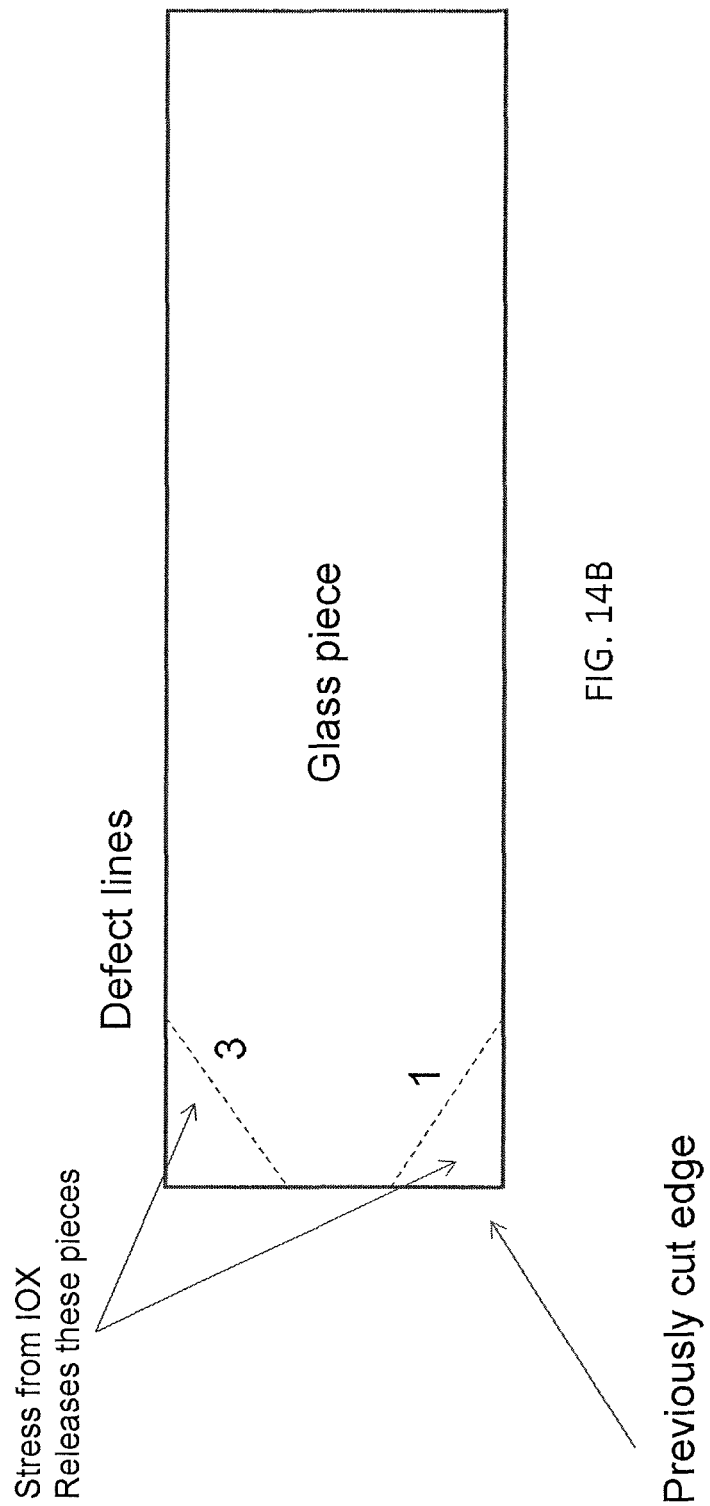

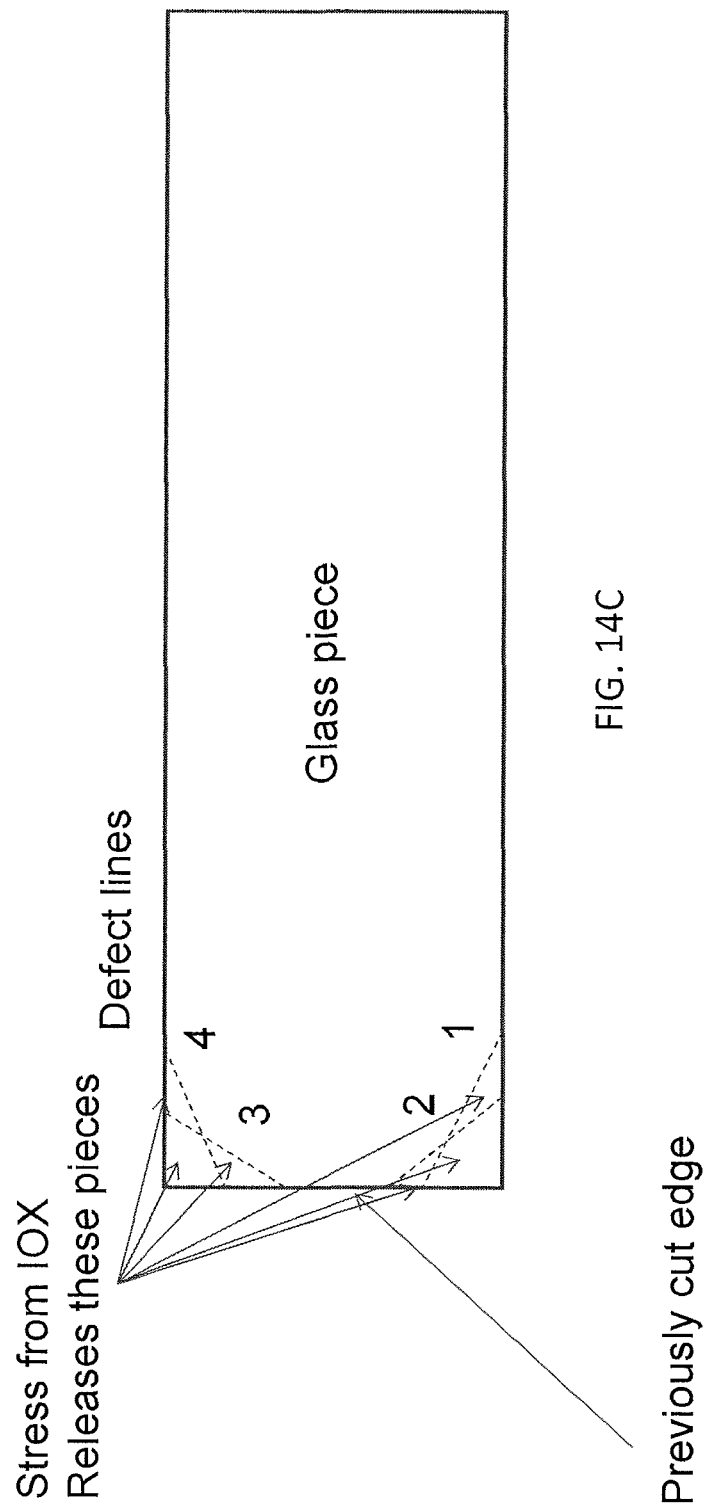

EDGE CHAMFERING METHODS

RELATED APPLICATIONS

This application claims the benefit of U.S. Provisional Application No. 61/917,213 filed on Dec. 17, 2013 as well as the benefit of U.S. Provisional Application No. 62/022,885 filed on Jul. 10, 2014 the entire disclosures of which are incorporated herein by reference.

BACKGROUND

In all cases where glass panels are cut for applications in architectural, automotive, consumer electronics, to mention a few areas, there will be edges, which will very likely require attention. There are as many different methods to cut and separate glass as there are edge shapes. Glass can be cut mechanically (CNC machining, abrasive waterjet, scribing and breaking, etc), using electro-magnetic radiation (lasers, electrical discharges, gyrotron, etc) and many other methods. The more traditional and common methods (scribe and break or CNC machining) create edges that are populated with different types and sizes of defects. It is also common to find that the edges are not perfectly perpendicular to the surfaces. In order to eliminate the defects and give the edges a more even surface with improved strength, they are usually ground. The grinding process involves abrasive removal of edge material that can give it the desired finishing and also shape its form (bull nosed, chamfered, pencil shape, etc). In order to allow the grinding and polishing steps, it is necessary to cut parts that are larger than the final desired dimensions.

While it is well known and understood that eliminating defects will increase edge strength, there is not an agreement on the impact that shape has on edge strength. The confusion occurs mainly because it is well known that shape helps to increase damage resistance to impact and handling of the edges. The fact is that edge shape really does not determine edge strength as defined by resistance to flexural (or bending) forces, but the defects size and distribution do have a great impact. However, a shaped edge does help to improve impact resistance by creating smaller cross section and containing defects. For example, an edge with a straight face that is perpendicular to both surfaces accumulates stress at these right angled corners that will chip and break when it is impacted by another object. Because of the accumulated stress, the size of defects can be pretty big, which will diminish the strength of that edge considerably. On the other hand, due to its smoother shape, a rounded "bull-nosed" shaped edge will have lower accumulated stress and smaller cross section which helps to reduce the size and penetration of defects into the volume of the edge. Therefore, after an impact, a shaped edge should have higher "bending" strength than a flat edge.

For the reasons discussed above, it is often desirable to have the edges shaped, as opposed to flat and perpendicular to the surfaces. One important aspect of these mechanical cutting and edge shaping methods is the degree of maintenance of the machines. Both for cutting and grinding, old and worn down cutting heads or grinding rolls can produce damage which can significantly affect the strength of the edges, even if the naked eye cannot be see the differences. Other issues with mechanical cutting and grinding methods is that they are very labor intensive and require many grinding and polishing steps until the final desired finish, which generate a lot of debris and require cleaning steps to avoid introduction of damages to the surfaces.

From process development and cost perspectives there are many opportunities for improvement in cutting and chamfering edges of glass substrates. It is of great interest to have a faster, cleaner, cheaper, more repeatable and more reliable method of creating shaped edges than what is currently practiced in the market today. Among several alternative technologies, laser and other thermal sources have been tried and demonstrated to create shaped edges.

In general, ablative laser techniques tend to be slow due to the low material removal rate and they also generate a lot of debris and heat affected zones that lead to residual stress and micro-cracks. For the same reason, melting and reshaping of the edges are also plagued with a lot of deformation and accumulated thermal stress that can peel that processed area. Finally, for the thermal peeling or crack propagating techniques, one of the main issues encountered is that the peeling is not continuous.

Subsurface damage, or the small microcracks and material modification caused by any cutting process, is a concern for the edge strength of glass or other brittle materials. Mechanical and ablative laser processes are particularly problematic with regard to subsurface damage. Edges cut with these processes typically require a lot of post-cut grinding and polish to remove the subsurface damage layer, thereby increasing edge strength to performance level required for applications such as in consumer electronics.

SUMMARY

According to embodiments described herein, processes of chamfering and/or beveling an edge of a glass substrate of arbitrary shape using lasers are presented. One embodiment involves cutting the edge with the desired chamfer shape utilizing an ultra-short pulse laser that may be optionally followed by a $CO_2$ laser for fully automated separation. Another embodiment involves thermal stress peeling of a sharp edge corner with different combination of an ultrashort pulse and/or $CO_2$ lasers. Another embodiment includes cutting the glass substrate by any cutting method, such as utilizing the ultra-short pulse laser, followed by chamfering solely by the use of a $CO_2$ laser.

In one embodiment, a method of laser processing a material includes focusing a pulsed laser beam into a laser beam focal line and directing the laser beam focal line into the material at a first angle of incidence to the material, the laser beam focal line generating an induced absorption within the material, the induced absorption producing a defect line along the laser beam focal line within the material. The method also includes translating the material and the laser beam relative to each other, thereby forming a plurality of defect lines along a first plane at the first angle within the material, and directing the laser beam focal line into the material at a second angle of incidence to the material, the laser beam focal line generating an induced absorption within the material, the induced absorption producing a defect line along the laser beam focal line within the material. The method further includes translating the material or the laser beam relative to one another, thereby forming a plurality of defect lines along a second plane at the second angle within the material, the second plane intersecting the first plane.

According to another embodiment, a method of laser processing a material includes focusing a pulsed laser beam into a laser beam focal line, and forming a plurality of defect lines along each of N planes within the material. The method also includes directing the laser beam focal line into the material at a corresponding angle of incidence to the material, the laser beam focal line generating an induced absorption within the material, the induced absorption producing a defect line along the laser beam focal line within the material. The method further includes translating the material and the laser beam relative to each other, thereby forming the plurality of defect lines along the corresponding plane of the N planes.

According to yet another embodiment, a method of laser processing a workpiece includes focusing a pulsed laser beam into a laser beam focal line directed into the workpiece at an angle of incidence to the workpiece, the angle intersecting an edge of the workpiece, the laser beam focal line generating an induced absorption within the workpiece, and the induced absorption producing a defect line along the laser beam focal line within the workpiece. The method also includes translating the workpiece and the laser beam relative to each other, thereby forming a plurality of defect lines along a plane at the angle within the workpiece, and separating the workpiece along the plane by applying an ion-exchange process to the workpiece.

In still another embodiment, a method of laser processing a material includes focusing a pulsed laser beam into a laser beam focal line directed into the material, the laser beam focal line generating an induced absorption within the material, and the induced absorption producing a defect line along the laser beam focal line within the material. The method also includes translating the material and the laser beam relative to each other along a contour, thereby forming a plurality of defect lines along the contour within the material to trace a part to be separated, and separating the part from the material. The method further includes directing a focused infrared laser into the part along a line adjacent an edge at a first surface of the part to peel a first strip that defines a first chamfered edge, and directing the focused infrared laser into the part along a line adjacent the edge at a second surface of the part to peel a second strip that defines a second chamfered edge.

The present disclosure extends to:
A method of laser processing comprising:
 focusing a pulsed laser beam into a laser beam focal line;
 directing the laser beam focal line into a material at a first angle of incidence to the material, the laser beam focal line generating an induced absorption within the material, the induced absorption producing a defect line along the laser beam focal line within the material;
 translating the material and the laser beam relative to each other, thereby forming a plurality of defect lines along a first plane at the first angle within the material;
 directing the laser beam focal line into the material at a second angle of incidence to the material, the laser beam focal line generating an induced absorption within the material, the induced absorption producing a defect line along the laser beam focal line within the material; and
translating the material or the laser beam relative to one another, thereby forming a plurality of defect lines along a second plane at the second angle within the material, the second plane intersecting the first plane.

The present disclosure extends to:
A method of laser processing a material comprising:
focusing a pulsed laser beam into a laser beam focal line;
forming a plurality of defect lines along each of N planes within the material, the forming plurality of defect lines including:

(a) directing the laser beam focal line into the material at an angle of incidence to the material corresponding to one of the N planes, the laser beam focal line generating an induced absorption within the material, the induced absorption producing a defect line along the laser beam focal line within the material;
(b) translating the material and the laser beam relative to each other, thereby forming the plurality of defect lines along the one of the N planes; and (c) repeating (a) and (b) for each of the N planes.

The present disclosure extends to:
A method of laser processing a workpiece comprising:
 focusing a pulsed laser beam into a laser beam focal line;
 directing the laser beam focal line into the workpiece at an angle of incidence to the workpiece, the angle of incidence intersecting an edge of the workpiece, the laser beam focal line generating an induced absorption within the workpiece, the induced absorption producing a defect line along the laser beam focal line within the workpiece;
 translating the workpiece and the laser beam relative to each other, thereby forming a plurality of defect lines along a plane at the angle within the workpiece; and
separating the workpiece along the plane by subjecting the workpiece to an ion-exchange process.

The present disclosure extends to:
A method of laser processing a material comprising:
 focusing a pulsed laser beam into a laser beam focal line;
 directing the laser beam focal line into a material, the laser beam focal line generating an induced absorption within the material, the induced absorption producing a defect line along the laser beam focal line within the material;
 translating the material and the laser beam relative to each other along a contour, thereby forming a plurality of defect lines along the contour within the material, the contour tracing the perimeter of a part to be separated from the material;
 separating the part from the material;
 directing a focused infrared laser into the separated part along a line adjacent an edge at a first surface of the part to peel a first strip that defines a first chamfered edge of the separated part; and
directing the focused infrared laser into the separated part along a line adjacent the edge at a second surface of the part to peel a second strip that defines a second chamfered edge of the separated part.

The present disclosure extends to:
A glass article including at least one chamfered edge having a plurality of defect lines extending at least 250 μm, the defect lines each having a diameter less than or equal to about 5 μm.

BRIEF DESCRIPTION OF THE DRAWINGS

The foregoing will be apparent from the following more particular description of example embodiments of the disclosure, as illustrated in the accompanying drawings in which like reference characters refer to the same parts throughout the different views. The drawings are not necessarily to scale, emphasis instead being placed upon illustrating embodiments of the present disclosure.

FIGS. 1A-1C are illustrations of a fault line with equally spaced defect lines of modified glass.

FIGS. 2A and 2B are illustrations of positioning of the laser beam focal line, i.e., the processing of a material transparent for the laser wavelength due to the induced absorption along the focal line.

FIG. 4 is an illustration of a second optical assembly for laser drilling.

FIG. 14A is an illustration of a cut part with internal defect lines being placed into ion-exchange, which adds enough stress to remove the perforated edges and form the desired edge chamfer.

FIG. 14B is the use of ion exchange (IOX) to release chamfered corners, similar to the illustration shown in FIG. 14A, but with only two defect line planes.

FIG. 14C is an illustration of a chamfer with many angles (more than 3 defect line planes).

DETAILED DESCRIPTION

Figure 3A:
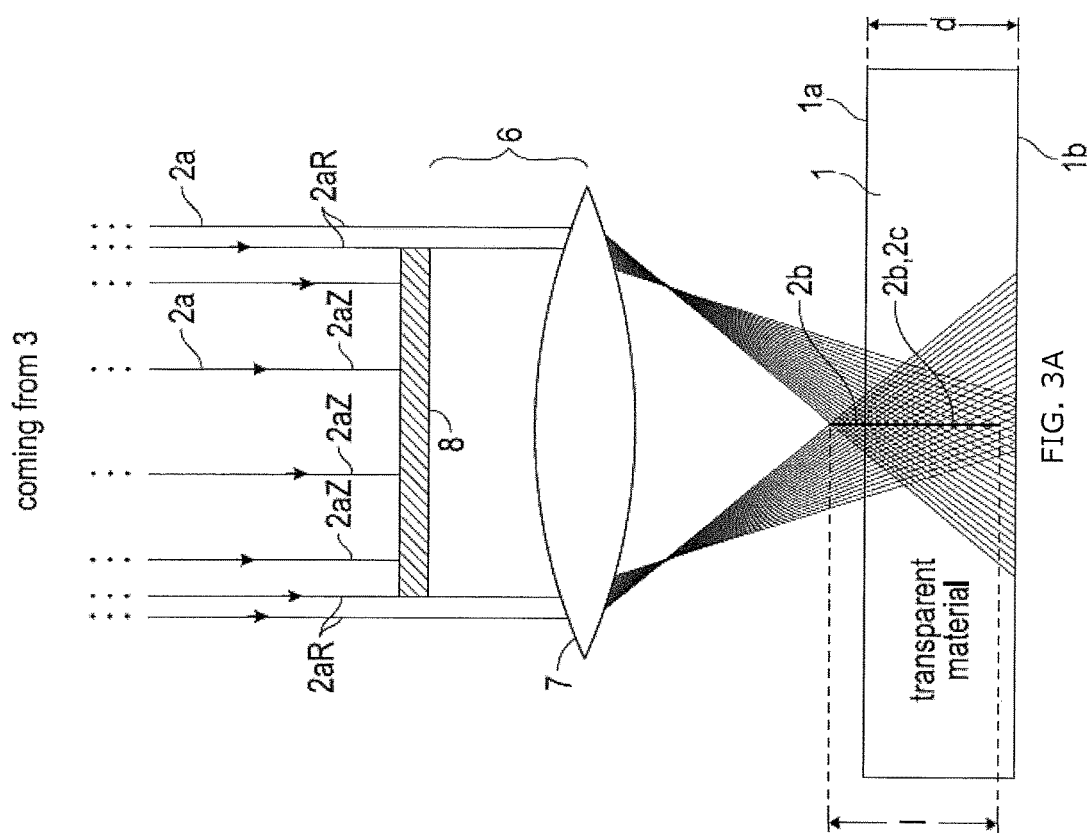
FIG. 3A is an illustration of an optical assembly for laser drilling according.

A description of exemplary embodiments follows.

Embodiments described herein relate to processes of chamfering and/or beveling an edge of a glass substrate and other substantially transparent materials of arbitrary shape using lasers. Within the context of the present disclosure, a material is substantially transparent to the laser wavelength when the absorption is less than about 10%, preferably less than about 1% per mm of material depth at this wavelength. A first embodiment involves cutting the edge with the desired chamfer shape utilizing an ultra-short pulse laser that may be optionally followed by an infrared (e.g., $CO_2$) laser for fully automated separation. A second embodiment involves thermal stress peeling of a sharp edge corner with different combinations of an ultrashort pulse and/or $CO_2$ lasers. Another embodiment includes cutting the glass substrate by any cutting method, such as utilizing the ultra-short pulse laser, followed by chamfering solely by the use of a $CO_2$ laser to work with different combinations of an ultra-short pulse and/or $CO_2$ lasers.

In the first method, the process fundamental step is to create fault lines on intersecting planes that delineate the desired edge shape and establish a path of least resistance for crack propagation and hence separation and detachment of the shape from its substrate matrix. This method essentially creates the shaped edge while cutting the part out of the main substrate. The laser separation method can be tuned and configured to enable manual separation, partial separation, or self-separation of the shaped edges out of the original substrate. The underlying principle to generate these fault lines is described in detail below and in U.S. Application No. 61/752,489 filed on Jan. 15, 2013, the entire contents of which are incorporated herein by reference as if fully set forth herein.

In the first step, the object to be processed is irradiated with an ultra-short pulsed laser beam that is condensed into a high aspect ratio line focus that penetrates through the thickness of the substrate. Within this volume of high energy density the material is modified via nonlinear effects. It is important to note that without this high optical intensity, nonlinear absorption is not triggered. Below this intensity threshold, the material is transparent to the laser radiation and remains in its original state.

The selection of the laser source is predicated on the ability to induce multi-photon absorption (MPA) in the transparent material. MPA is the simultaneous absorption of multiple photons of identical or different frequencies in order to excite a material from a lower energy state (usually the ground state) to a higher energy state (excited state). The excited state may be an excited electronic state or an ionized state. The energy difference between the higher and lower energy states of the material is equal to the sum of the energies of the two or more photons. MPA is a nonlinear process that is generally several orders of magnitude weaker than linear absorption. It differs from linear absorption in that the strength of MPA depends on the square or higher power of the light intensity, thus making it a nonlinear optical process. At ordinary light intensities, MPA is negligible. If the light intensity (energy density) is extremely high, such as in the region of focus of a laser source (particularly a pulsed laser source), MPA becomes appreciable and leads to measurable effects in the material within the region where the energy density of the light source is sufficiently high. Within the focal region, the energy density may be sufficiently high to result in ionization.

At the atomic level, the ionization of individual atoms has discrete energy requirements. Several elements commonly used in glass (e.g., Si, Na, K) have relatively low ionization energies (~5 eV). Without the phenomenon of MPA, a wavelength of about 248 nm would be required to create linear ionization at ~5 eV. With MPA, ionization or excitation between states separated in energy by ~5 eV can be accomplished with wavelengths longer than 248 nm. For example, photons with a wavelength of 532 nm have an energy of ~2.33 eV, so two photons with wavelength 532 nm can induce a transition between states separated in energy by ~4.66 eV in two-photon absorption (TPA), for example. Thus, atoms and bonds can be selectively excited or ionized in the regions of a material where the energy density of the laser beam is sufficiently high to induce nonlinear TPA of a laser wavelength having half the required excitation energy, for example.

MPA can result in a local reconfiguration and separation of the excited atoms or bonds from adjacent atoms or bonds. The resulting modification in the bonding or configuration can result in non-thermal ablation and removal of matter from the region of the material in which MPA occurs. This removal of matter creates a structural defect (e.g. a defect line, damage line, or "perforation") that mechanically weakens the material and renders it more susceptible to cracking or fracturing upon application of mechanical or thermal stress. By controlling the placement of perforations, a contour or path along which cracking occurs can be precisely defined and precise micromachining of the material can be accomplished. The contour defined by a series of perforations may be regarded as a fault line and corresponds to a region of structural weakness in the material. In one embodiment, micromachining includes separation of a part from the material processed by the laser, where the part has a precisely defined shape or perimeter determined by a closed contour of perforations formed through MPA effects induced by the laser. As used herein, the term closed contour refers to a perforation path formed by the laser line, where the path intersects with itself at some location. An internal contour is a path formed where the resulting shape is entirely surrounded by an outer portion of material.

The laser is ultrashort pulsed laser (pulse durations on the order tens of picoseconds or shorter) and can be operated in pulse mode or burst mode. In pulse mode, a series of nominally identical single pulses is emitted from the laser and directed to the workpiece. In pulse mode, the repetition rate of the laser is determined by the spacing in time between the pulses. In burst mode, bursts of pulses are emitted from the laser, where each burst includes two or more pulses (of equal or different amplitude). In burst mode, pulses within a burst are separated by a first time interval (which defines a pulse repetition rate for the burst) and the bursts are separated by a second time interval (which defines a burst repetition rate), where the second time interval is typically much longer than the first time interval. As used herein (whether in the context of pulse mode or burst mode), time interval refers to the time difference between corresponding parts of a pulse or burst (e.g. leading edge-to-leading edge, peak-to-peak, or trailing edge-to-trailing edge). Pulse and burst repetition rates are controlled by the design of the laser and can typically be adjusted, within limits, by adjusting operating conditions of the laser. Typical pulse and burst repetition rates are in the kHz to MHz range.

The laser pulse duration (in pulse mode or for pulses within a burst in burst mode) may be $10^{-10}$ s or less, or $10^{-11}$ s or less, or $10^{-12}$ s or less, or $10^{-13}$ s or less. In the exemplary embodiments described herein, the laser pulse duration is greater than $10^{-15}$.

The perforations may be spaced apart and precisely positioned by controlling the velocity of a substrate or stack relative to the laser through control of the motion of the laser and/or the substrate or stack. As an example, in a thin transparent substrate moving at 200 mm/sec exposed to a 100 kHz series of pulses (or bursts of pulses), the individual pulses would be spaced 2 microns apart to create a series of perforations separated by 2 microns. This defect line (perforation) spacing is sufficiently close to allow for mechanical or thermal separation along the contour defined by the series of perforations.

FIGS. 1A-1C illustrate that a method to cut and separate a substrate material (e.g., sapphire or glass) can be essentially based on creating a fault line 110 formed of a plurality of vertical defect lines 120 in the substrate material 130 with an ultra-short pulsed laser 140. Depending on the material properties (absorption, CTE, stress, composition, etc) and laser parameters chosen for processing the material 130, the creation of a fault line 110 alone can be enough to induce self-separation. In this case, no secondary separation processes, such as tension/bending forces, heating, or $CO_2$ laser, are necessary. Distance between adjacent defect lines 120 along the direction of the fault lines 110 can, for example, be in the range from 0.25 µm to 50 µm, or in the range from 0.50 µm to about 20 µm, or in the range from 0.50 µm to about 15 µm, or in the range from 0.50 µm to 10 µm, or in the range from 0.50 µm to 3.0 µm or in the range from 3.0 µm to 10 µm.

By scanning the laser over a particular path or contour, a series of perforations is created (a few microns wide) that defines the perimeter or shape of the part to be separated from the substrate. The series of perforations may also be referred to herein as a fault line. The particular laser method used (described below) has the advantage that in a single pass, it creates highly controlled perforation through the material, with extremely little (<75 µm, often <50 µm) subsurface damage and debris generation. This is in contrast to the typical use of spot-focused laser to ablate material, where multiple passes are often necessary to completely perforate the glass thickness, large amounts of debris are formed from the ablation process, and more extensive subsurface damage (>100 µm) and edge chipping occur. As used herein, subsurface damage refers to the maximum size (e.g. length, width, diameter) of structural imperfections in the perimeter surface of the part separated from the substrate or material subjected to laser processing in accordance with the present disclosure. Since the structural imperfections extend from the perimeter surface, subsurface damage may also be regarded as the maximum depth from the perimeter surface in which damage from laser processing in accordance with the present disclosure occurs. The perimeter surface of the separated part may be referred to herein as the edge or the edge surface of the separated part. The structural imperfections may be cracks or voids and represent points of mechanical weakness that promote fracture or failure of the part separated from the substrate or material. By minimizing the size of subsurface damage, the present method improves the structural integrity and mechanical strength of separated parts.

In some cases, the created fault line is not enough to separate the part from the substrate spontaneously and a secondary step may be necessary. If so desired, a second laser can be used to create thermal stress to separate it. Separation can be achieved after the creation of a fault line, for example, by application of mechanical force or by using a thermal source (e.g. an infrared laser, for example a $CO_2$ laser) to create thermal stress and force the part to separate from the substrate. Another option is to have the $CO_2$ laser only start the separation and then finish the separation manually. The optional $CO_2$ laser separation is achieved, for example, with a defocused cw laser emitting at 10.6 µm and with power adjusted by controlling its duty cycle. Focus change (i.e., extent of defocusing up to and including focused spot size) is used to vary the induced thermal stress by varying the spot size. Defocused laser beams include those laser beams that produce a spot size larger than a minimum, diffraction-limited spot size on the order of the size of the laser wavelength. For example, defocused spot sizes ($1/e^2$ diameter) of about 2 to 12 mm, or 7 mm, 2 mm and 20 mm can be used for $CO_2$ lasers, for example, whose diffraction-limited spot size is much smaller given the emission wavelength of 10.6 µm. The power density of the cw laser is controlled or selected to provide a relatively low intensity beam, such that laser spot heats the surface of the substrate material to create thermal stress without ablation and without inducing formation of cracks that deviate substantially from the plane containing the defect lines. The length of cracks deviating from the defect lines is less than 20 µm, or less than 5 µm, or less than 1 µm.

There are several methods to create the defect line. The optical method of forming the line focus can take multiple forms, using donut shaped laser beams and spherical lenses, axicon lenses, diffractive elements, or other methods to form the linear region of high intensity. The type of laser (picosecond, femtosecond, etc.) and wavelength (IR, green, UV, etc.) can also be varied, as long as sufficient optical intensities are reached in the region of focus to create breakdown of the substrate material through nonlinear optical effects. Substrate materials include glass, glass laminates, glass composites, sapphire, glass-sapphire stacks, and other materials that are substantially transparent to the wavelength of the laser. A sapphire layer can be bonded onto a glass substrate, for example. Glass substrates can include high-performance glass such as Corning's Eagle X6®, or inexpensive glass such as soda-lime glass, for example.

In the present application, an ultra-short pulsed laser is used to create a high aspect ratio vertical defect line in a consistent, controllable and repeatable manner. The details of the optical setup that enables the creation of this vertical defect line are described below, and in U.S. Application No. 61/752,489 filed on Jan. 15, 2013, which is also referenced above, and the entire contents of which are incorporated by reference as if fully set forth herein. The essence of this concept is to use an axicon lens element in an optical lens assembly to create a region of high aspect ratio, taper-free microchannels using ultra-short (picoseconds or femtosecond duration) Bessel beams. In other words, the axicon condenses the laser beam into a high intensity region of cylindrical shape and high aspect ratio (long length and small diameter) in the substrate material. Due to the high intensity created with the condensed laser beam, nonlinear interaction of the electromagnetic field of the laser and the substrate material occurs and the laser energy is transferred to the substrate to effect formation of defects that become constituents of the fault line. However, it is important to realize that in the areas of the material where the laser energy intensity is not high (e.g., substrate surface, volume of substrate surrounding the central convergence line), the material is transparent to the laser and there is no mechanism for transferring energy from the laser to the material. As a result, nothing happens to the substrate when the laser intensity is below the nonlinear threshold.

As described above, it is possible to create microscopic (e.g., <0.5 µm and >100 nm in diameter or <2 µm and >100 nm in diameter) elongated defect lines (also referred to herein as perforations or damage tracks) in a transparent material using one or more high energy pulses or one or more bursts of high energy pulses. The perforations represent regions of the substrate material modified by the laser. The laser-induced modifications disrupt the structure of the substrate material and constitute sites of mechanical weakness. Structural disruptions include compaction, melting, dislodging of material, rearrangements, and bond scission. The perforations extend into the interior of the substrate material and have a cross-sectional shape consistent with the cross-sectional shape of the laser (generally circular). The average diameter of the perforations may be in the range from 0.1 µm to 50 µm, or in the range from 1 µm to 20 µm, or in the range from 2 µm to 10 µm, or in the range from 0.1 µm to 5 µm. In some embodiments, the perforation is a "through hole", which is a hole or an open channel that extends from the top to the bottom of the substrate material. In some embodiments, the perforation may not be a continuously open channel and may include sections of solid material dislodged from the substrate material by the laser. The dislodged material blocks or partially blocks the space defined by the perforation. One or more open channels (unblocked regions) may be dispersed between sections of dislodged material. The diameter of the open channels is may be <1000 nm, or <500 nm, or <400 nm, or <300 nm or in the range from 10 nm to 750 nm, or in the range from 100 nm to 500 nm. The disrupted or modified area (e.g, compacted, melted, or otherwise changed) of the material surrounding the holes in the embodiments disclosed herein, preferably has diameter of <50 µm (e.g, <10 µm).

The individual perforations can be created at rates of several hundred kilohertz (several hundred thousand perforations per second, for example). Thus, with relative motion between the laser source and the material these perforations can be placed adjacent to one another (spatial separation varying from sub-micron to several microns or even tens of microns as desired). This spatial separation is selected in order to facilitate cutting.

Turning to FIGS. 2A and 2B, a method of laser drilling a material includes focusing a pulsed laser beam 2 into a laser beam focal line 2b, viewed along the beam propagation direction. Laser beam focal line 2b can be created by several ways, for example, Bessel beams, Airy beams, Weber beams and Mathieu beams (i.e, non-diffractive beams), whose field profiles are typically given by special functions that decay more slowly in the transverse direction (i.e. direction of propagation) than the Gaussian function. As shown in FIG. 3A, laser 3 (not shown) emits laser beam 2, at the beam incidence side of the optical assembly 6 referred to as 2a, which is incident onto the optical assembly 6. The optical assembly 6 turns the incident laser beam into a laser beam focal line 2b on the output side over a defined expansion range along the beam direction (length 1 of the focal line). The planar substrate 1 to be processed is positioned in the beam path after the optical assembly overlapping at least partially the laser beam focal line 2b of laser beam 2. Reference 1a designates the surface of the planar substrate facing the optical assembly 6 or the laser, respectively, and reference 1b designates the reverse surface of substrate 1 (the surface remote, or further away from, optical assembly 6 or the laser). The substrate thickness (measured perpendicularly to the planes 1a and 1b, i.e., to the substrate plane) is labeled with d.

As FIG. 2A depicts, substrate 1 is aligned substantially perpendicularly to the longitudinal beam axis and thus behind the same focal line 2b produced by the optical assembly 6 (the substrate is perpendicular to the drawing plane) and viewed along the beam direction it is positioned relative to the focal line 2b in such a way that the focal line 2b viewed in beam direction starts before the surface 1a of the substrate and stops before the surface 1b of the substrate, i.e. still within the substrate. In the overlapping area of the laser beam focal line 2b with substrate 1, i.e. in the substrate material covered by focal line 2b, the laser beam focal line 2b thus generates (in case of a suitable laser intensity along the laser beam focal line 2b which intensity is ensured due to the focusing of laser beam 2 on a section of length 1, i.e. a line focus of length 1) a section 2c aligned with the longitudinal beam direction, along which an induced nonlinear absorption is generated in the substrate material. Such line focus can be created by several ways, for example, Bessel beams, Airy beams, Weber beams and Mathieu beams (i.e, non-diffractive beams), whose field profiles are typically given by special functions that decay more slowly in the transverse direction (i.e. direction of propagation) than the Gaussian function. The induced nonlinear absorption induces defect line formation in the substrate material along section 2c. The defect line formation is not only local, but extends over the entire length of section 2c of the induced absorption. The length of section 2c (which corresponds to the length of the overlapping of laser beam focal line 2b with substrate 1) is labeled with reference L. The average diameter or extent of the section of the induced absorption (or the sections in the material of substrate 1 undergoing the defect line formation) is labeled with reference D. The average extension D basically corresponds to the average diameter δ of the laser beam focal line 2b, that is, an average spot diameter in a range of between about 0.1 µm and about 5 µm.

As FIG. 2A shows, the substrate material (which is transparent for the wavelength λ of laser beam 2) is heated due to the induced absorption along the focal line 2b. FIG. 2B illustrates that the heated substrate material will eventually expand so that a corresponding induced tension leads to micro-crack formation, with the tension being the highest at surface 1a.

Representative optical assemblies 6, which can be applied to generate the focal line 2b, as well as optical systems in which these optical assemblies can be applied, are described below. All assemblies or systems are based on the description above so that identical references are used for identical components or features or those which are equal in their function. Therefore only the differences are described below.

To ensure high quality (regarding breaking strength, geometric precision, roughness and avoidance of re-machining requirements) of the surface of the separated part along which separation occurs, the individual focal lines positioned on the substrate surface along the line of separation (fault line) should be generated using the optical assembly described below (hereinafter, the optical assembly is alternatively also referred to as laser optics). The roughness of the separated surface (the perimeter surface of the separated part) results is determined primarily by the spot size or the spot diameter of the focal line. Roughness of a surface can be characterized, for example, by the Ra surface roughness parameter defined by the ASME B46.1 standard. As described in ASME B46.1, Ra is the arithmetic average of the absolute values of the surface profile height deviations from the mean line, recorded within the evaluation length. In alternative terms, Ra is the average of a set of absolute height deviations of individual features (peaks and valleys) of the surface relative to the mean.

In order to achieve a small spot size of, for example, 0.5 µm to 2 µm for a given wavelength λ of the laser 3 that interacts with the material of substrate 1), certain requirements must usually be imposed on the numerical aperture of laser optics 6. These requirements are met by laser optics 6 described below. In order to achieve the required numerical aperture, the optics must, on the one hand, dispose of the required opening for a given focal length, according to the known Abbé formulae (N.A.=n sin (theta), n: refractive index of the glass to be processes, theta: half the aperture angle; and theta=arc tan $(D_L/2f)$; $D_L$: aperture diameter, f: focal length). On the other hand, the laser beam must illuminate the optics up to the required aperture, which is typically achieved by means of beam widening using widening telescopes between laser and focusing optics.

The spot size should not vary too strongly for the purpose of a uniform interaction along the focal line. This can, for example, be ensured (see the embodiment below) by illuminating the focusing optics only in a small, circular area so that the beam opening and thus the percentage of the numerical aperture only vary slightly.

According to FIG. 3A (section perpendicular to the substrate plane at the level of the central beam in the laser beam bundle of laser radiation 2; here, too, laser beam 2 is incident perpendicularly (before entering optical assembly 6) to the substrate plane, i.e. angle θ is 0° so that the focal line 2b or the section of the induced absorption 2c is parallel to the substrate normal), the laser radiation 2a emitted by laser 3 is first directed onto a circular aperture 8 which is completely opaque for the laser radiation used. Aperture 8 is oriented perpendicular to the longitudinal beam axis and is centered on the central beam of the depicted beam bundle 2a. The diameter of aperture 8 is selected in such a way that the beam bundles near the center of beam bundle 2a or the central beam (here labeled with 2aZ) hit the aperture and are completely absorbed by it. Only the beams in the outer perimeter range of beam bundle 2a (marginal rays, here labeled with 2aR) are not absorbed due to the reduced aperture size compared to the beam diameter, but pass aperture 8 laterally and hit the marginal areas of the focusing optic elements of the optical assembly 6, which is designed as a spherically cut, bi-convex lens 7 in this embodiment.

Lens 7 centered on the central beam is deliberately designed as a non-corrected, bi-convex focusing lens in the form of a common, spherically cut lens. In this design embodiment, the spherical aberration of such a lens is deliberately used. As an alternative, aspheres or multi-lens systems deviating from ideally corrected systems, which do not form an ideal focal point but a distinct, elongated focal line of a defined length, can also be used (i.e., lenses or systems which do not have a single focal point). The zones of the lens thus focus along a focal line 2b, subject to the distance from the lens center. The diameter of aperture 8 across the beam direction is approximately 90% of the diameter of the beam bundle (beam bundle diameter defined by the extension to the decrease to $1/e^2$) and approximately 75% of the diameter of the lens 7 of the optical assembly 6. The focal line 2b of a not aberration-corrected spherical lens 7 generated by blocking out the beam bundles in the center is thus used. FIG. 3A shows the section in one plane through the central beam, the complete three-dimensional bundle can be seen when the depicted beams are rotated around the focal line 2b.

One potential disadvantage of this type of a focal line formed by lens 7 and the system shown in FIG. 3A is that the conditions (spot size, laser intensity) along the focal line, and thus along the desired depth in the material, vary and that therefore the desired type of interaction (no melting, induced absorption, thermal-plastic deformation up to crack formation) may possibly occur only in selected portions of the focal line. This means in turn that possibly only a part of the incident laser light is absorbed in the desired way. In this way, the efficiency of the process (required average laser power for the desired separation speed) is impaired on the one hand, and on the other hand the laser light might be transmitted into undesired deeper places (parts or layers adherent to the substrate or the substrate holding fixture) and interact there in an undesirable way (heating, diffusion, absorption, unwanted modification).

Figures 1, 3B:
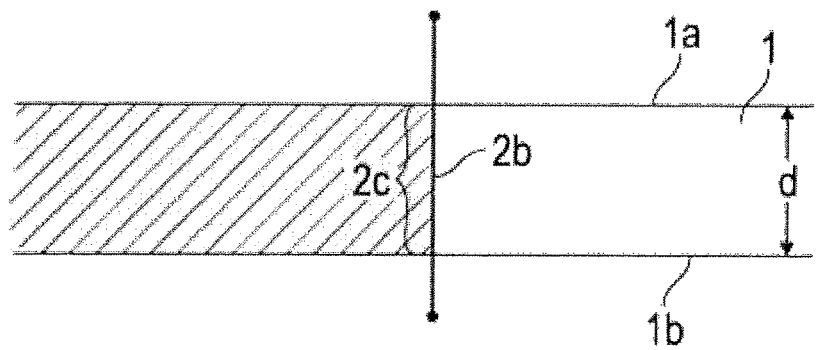
FIGS. 3B-1-3B-4 are an illustration of various possibilities to process the substrate by differently positioning the laser beam focal line relative to the substrate.
Figures 2, 3B:
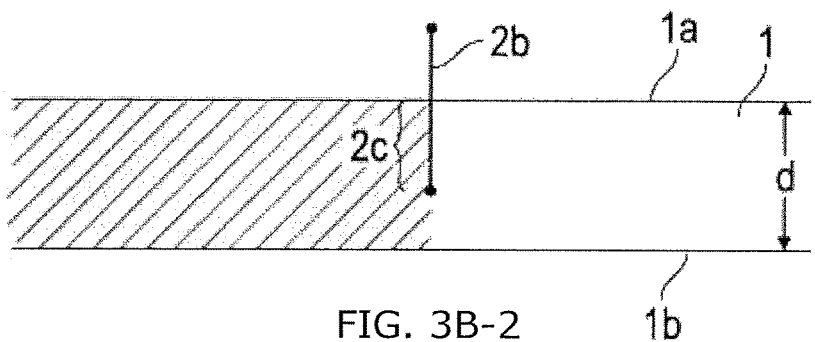
Figures 3, 3B:
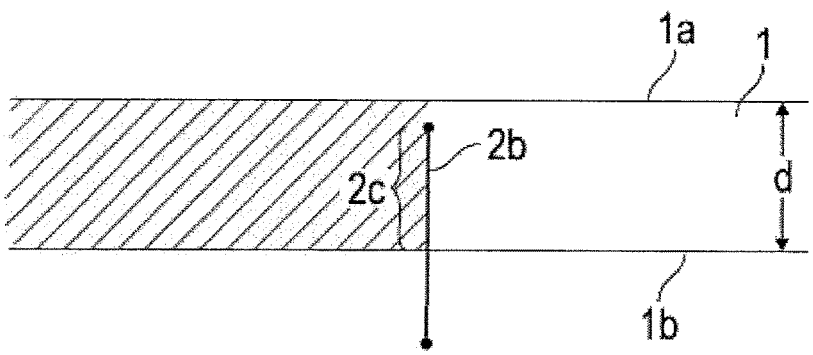
Figures 3, 3B, 4:
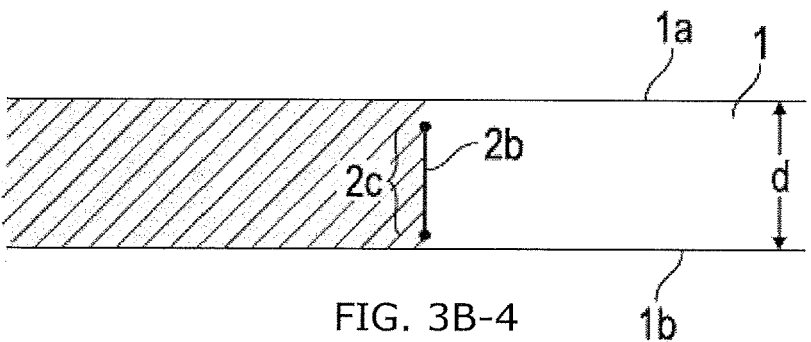
Figure 4:
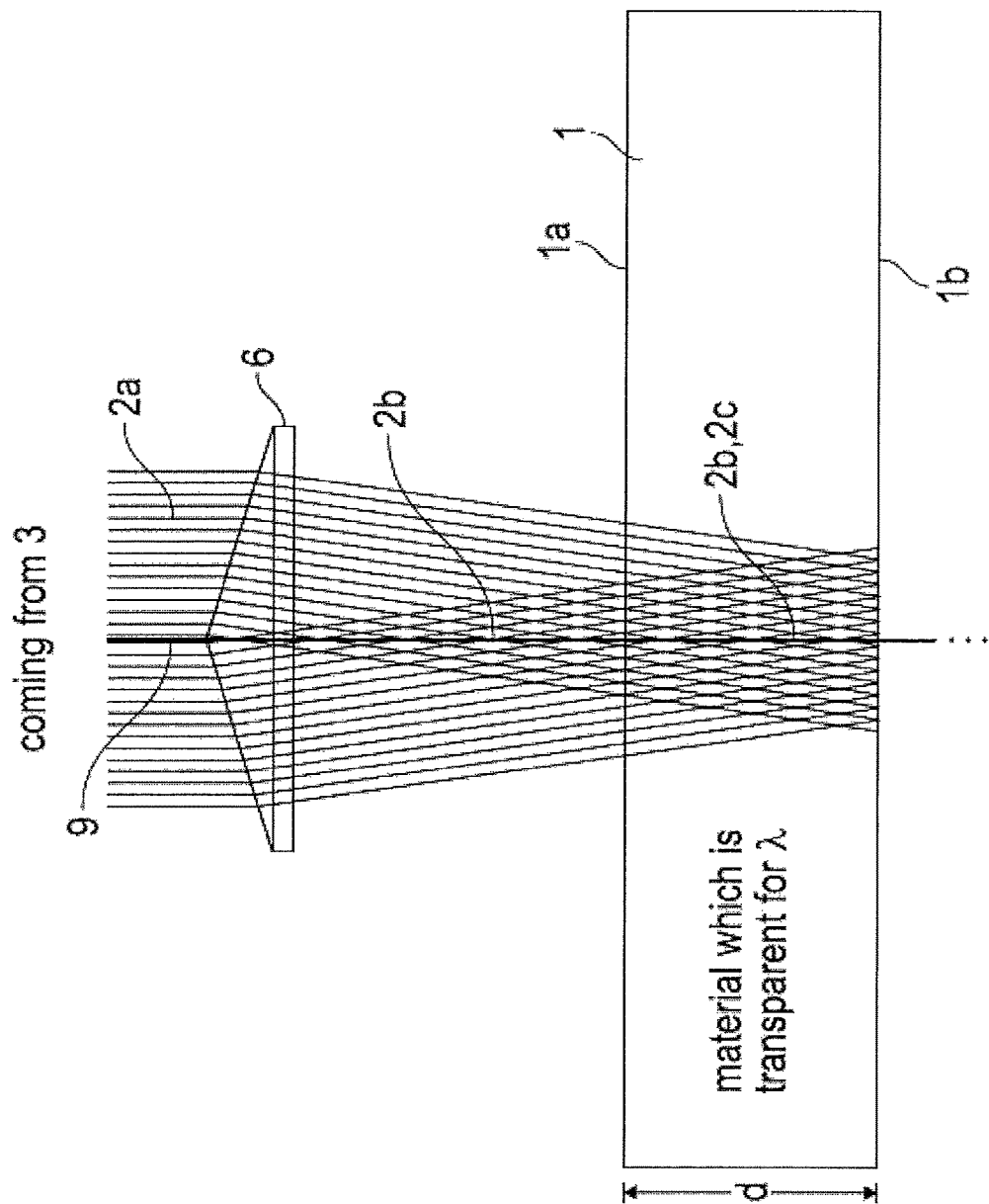

FIG. 3B-1-4 show (not only for the optical assembly in FIG. 3A, but basically also for any other applicable optical assembly 6) that the laser beam focal line 2b can be positioned differently by suitably positioning and/or aligning the optical assembly 6 relative to substrate 1 as well as by suitably selecting the parameters of the optical assembly 6. As FIG. 3B-1 outlines, the length 1 of the focal line 2b can be adjusted in such a way that it exceeds the substrate thickness d (here by factor 2). If substrate 1 is placed (viewed in longitudinal beam direction) centrally to focal line 2b, the section of induced absorption 2c is generated over the entire substrate thickness. The laser beam focal line 2b can have a length 1 in a range of between about 0.1 mm and about 100 mm or in a range of between about 0.1 mm and about 10 mm, or in a range of between about 0.1 mm and about 1 mm, for example. Various embodiments can be configured to have length 1 of about 0.1 mm, 0.2 mm, 0.3 mm, 0.4 mm, 0.5 mm, 0.7 mm, 1 mm, 2 mm, 3 mm or 5 mm, for example.

In the case shown in FIG. 3B-2, a focal line 2b of length 1 is generated which corresponds more or less to the substrate extension d. As substrate 1 relative to line 2 is positioned in such a way that line 2b starts in a point before, i.e. outside the substrate, the length L of the section of induced absorption 2c (which extends here from the substrate surface to a defined substrate depth, but not to the reverse surface 1b) is smaller than the length 1 of focal line 2b. FIG. 3B-3 shows the case in which the substrate 1 (viewed along the beam direction) is positioned above the starting point of focal line 2b so that, as in FIG. 3B-2, the length 1 of line 2b is greater than the length L of the section of induced absorption 2c in substrate 1. The focal line thus starts within the substrate and extends over the reverse (remote) surface 1b to beyond the substrate. FIG. 3B-4 shows the case in which the focal line length 1 is smaller than the substrate thickness d so that—in the case of a central positioning of the substrate relative to the focal line viewed in the direction of incidence—the focal line starts near the surface 1a within the substrate and ends near the surface 1b within the substrate (1=0.75·d).

It is particularly advantageous to realize the focal line positioning in such a way that at least one surface 1a, 1b is covered by the focal line, i.e. that the section of induced absorption 2c starts at least on one surface. In this way it is possible to achieve virtually ideal drilling or cutting avoiding ablation, feathering and particulation at the surface.

FIG. 4 depicts another applicable optical assembly 6. The basic construction follows the one described in FIG. 3A so that only the differences are described below. The depicted optical assembly is based the use of optics with a non-spherical free surface in order to generate the focal line 2b, which is shaped in such a way that a focal line of defined length 1 is formed. For this purpose, aspheres can be used as optic elements of the optical assembly 6. In FIG. 4, for example, a so-called conical prism, also often referred to as axicon, is used. An axicon is a special, conically cut lens which forms a spot source on a line along the optical axis (or transforms a laser beam into a ring). The layout of such an axicon is principally known to one skilled in the art; the cone angle in the example is 10°. The apex of the axicon labeled here with reference 9 is directed towards the incidence direction and centered on the beam center. As the focal line 2b of the axicon 9 already starts in its interior, substrate 1 (here aligned perpendicularly to the main beam axis) can be positioned in the beam path directly behind axicon 9. As FIG. 4 shows, it is also possible to shift substrate 1 along the beam direction due to the optical characteristics of the axicon while remaining within the range of focal line 2b. The section of the induced absorption 2c in the material of substrate 1 therefore extends over the entire substrate depth d.

However, the depicted layout is subject to the following restrictions: Since the region of focal line 2b formed by axicon 9 begins with axicon 9, a significant part of the laser energy is not focused into the section of induced absorption 2c of focal line 2b, which is located within the material, in the situation where there is a separation between axicon 9 and the material to be processed. Furthermore, length 1 of focal line 2b is related to the beam diameter for the refraction indices and cone angles of axicon 9. This is why, in case of relatively thin materials (several millimeters), the total focal line is much longer than the thickness of the substrate, having the effect that the laser energy is again not specifically focused into the material.

Figure 5A:
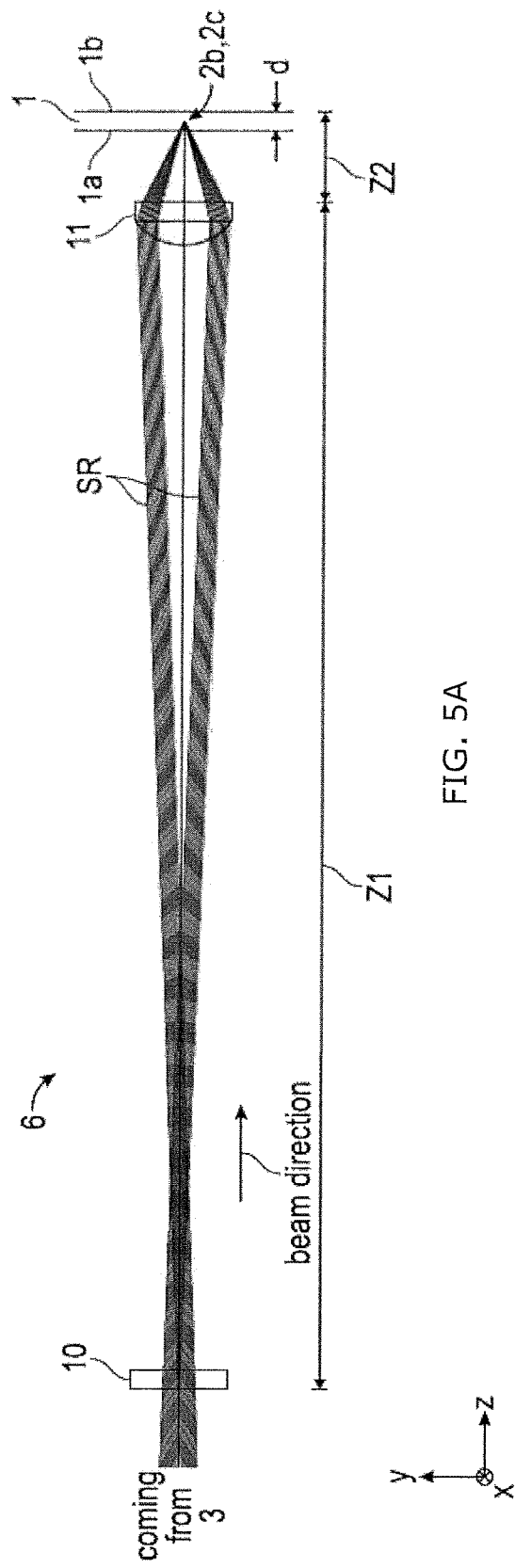
FIGS. 5A and 5B are illustrations of a third optical assembly for laser drilling.

For this reason, it may be desirable to use an optical assembly 6 which includes both an axicon and a focusing lens. FIG. 5A depicts such an optical assembly 6 in which a first optical element (viewed along the beam direction) with a non-spherical free surface designed to form a laser beam focal line 2b is positioned in the beam path of laser 3. In the case shown in FIG. 5A, this first optical element is an axicon 10 with a cone angle of 5°, which is positioned perpendicularly to the beam direction and centered on laser beam 3. The apex of the axicon is oriented towards the beam direction. A second, focusing optical element, here the plano-convex lens 11 (the curvature of which is oriented towards the axicon), is positioned in beam direction at a distance Z1 from the axicon 10. The distance Z1, in this case approximately 300 mm, is selected in such a way that the laser radiation formed by axicon 10 circularly incident on the outer radial portion of lens 11. Lens 11 focuses the circular radiation on the output side at a distance Z2, in this case approximately 20 mm from lens 11, on a focal line 2b of a defined length, in this case 1.5 mm. The effective focal length of lens 11 is 25 mm in this embodiment. The circular transformation of the laser beam by axicon 10 is labeled with the reference SR.

Figure 5B:
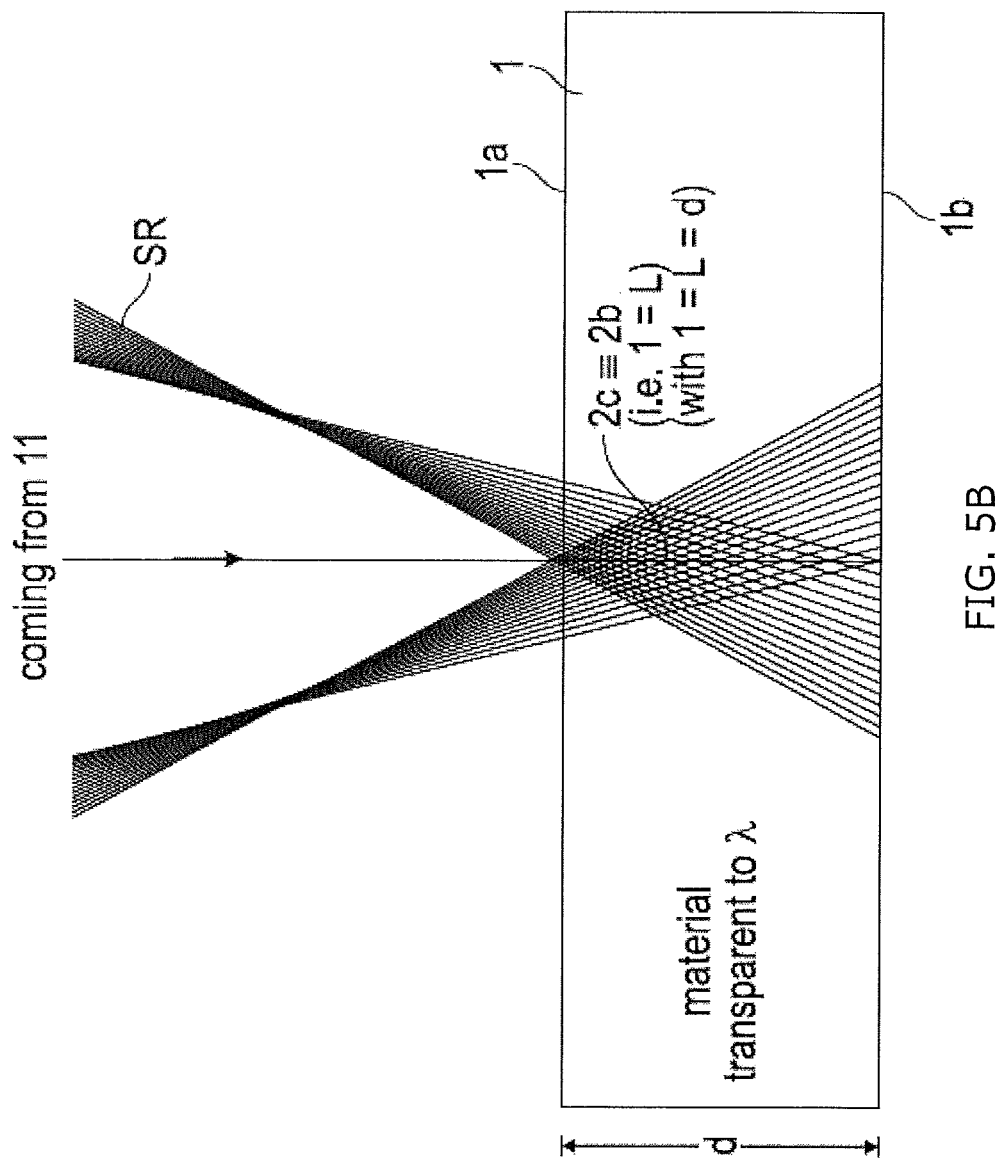

FIG. 5B depicts the formation of the focal line 2b or the induced absorption 2c in the material of substrate 1 according to FIG. 5A in detail. The optical characteristics of both elements 10, 11 as well as their positioning is selected in such a way that the extension 1 of the focal line 2b in beam direction is exactly identical with the thickness d of substrate 1. Consequently, an exact positioning of substrate 1 along the beam direction is required in order to position the focal line 2b exactly between the two surfaces 1a and 1b of substrate 1, as shown in FIG. 5B.

It is therefore advantageous if the focal line is formed at a certain distance from the laser optics, and if the greater part of the laser radiation is focused up to a desired end of the focal line. As described, this can be achieved by illuminating a primarily focusing element 11 (lens) only circularly (annularly) on a required zone, which, on the one hand, serves to realize the required numerical aperture and thus the required spot size, on the other hand, however, the circle of diffusion diminishes in intensity after the required focal line 2b over a very short distance in the center of the spot, as a basically circular spot is formed. In this way, the defect line formation is stopped within a short distance in the required substrate depth. A combination of axicon 10 and focusing lens 11 meets this requirement. The axicon acts in two different ways: due to the axicon 10, a usually round laser spot is sent to the focusing lens 11 in the form of a ring, and the asphericity of axicon 10 has the effect that a focal line is formed beyond the focal plane of the lens instead of at a focal point in the focal plane. The length 1 of focal line 2b can be adjusted via the beam diameter on the axicon. The numerical aperture along the focal line, on the other hand, can be adjusted via the distance Z1 (axicon-lens separation) and via the cone angle of the axicon. In this way, the entire laser energy can be concentrated in the focal line.

If the defect line formation is supposed to continue to the back side of the substrate, the circular (annular) illumination still has the advantage that (1) the laser power is used optimally in the sense that most of the laser light remains concentrated in the required length of the focal line, and (2) it is possible to achieve a uniform spot size along the focal line—and thus a uniform separation process along the focal line—due to the circularly illuminated zone in conjunction with the desired aberration set by means of the other optical functions.

Instead of the plano-convex lens depicted in FIG. 5A, it is also possible to use a focusing meniscus lens or another higher corrected focusing lens (asphere, multi-lens system).

In order to generate very short focal lines 2b using the combination of an axicon and a lens depicted in FIG. 5A, it would be necessary to select a very small beam diameter of the laser beam incident on the axicon. This has the practical disadvantage that the centering of the beam onto the apex of the axicon must be very precise and that therefore the result is very sensitive to directional variations of the laser (beam drift stability). Furthermore, a tightly collimated laser beam is very divergent, i.e. due to the light deflection the beam bundle becomes blurred over short distances.

Figure 6:
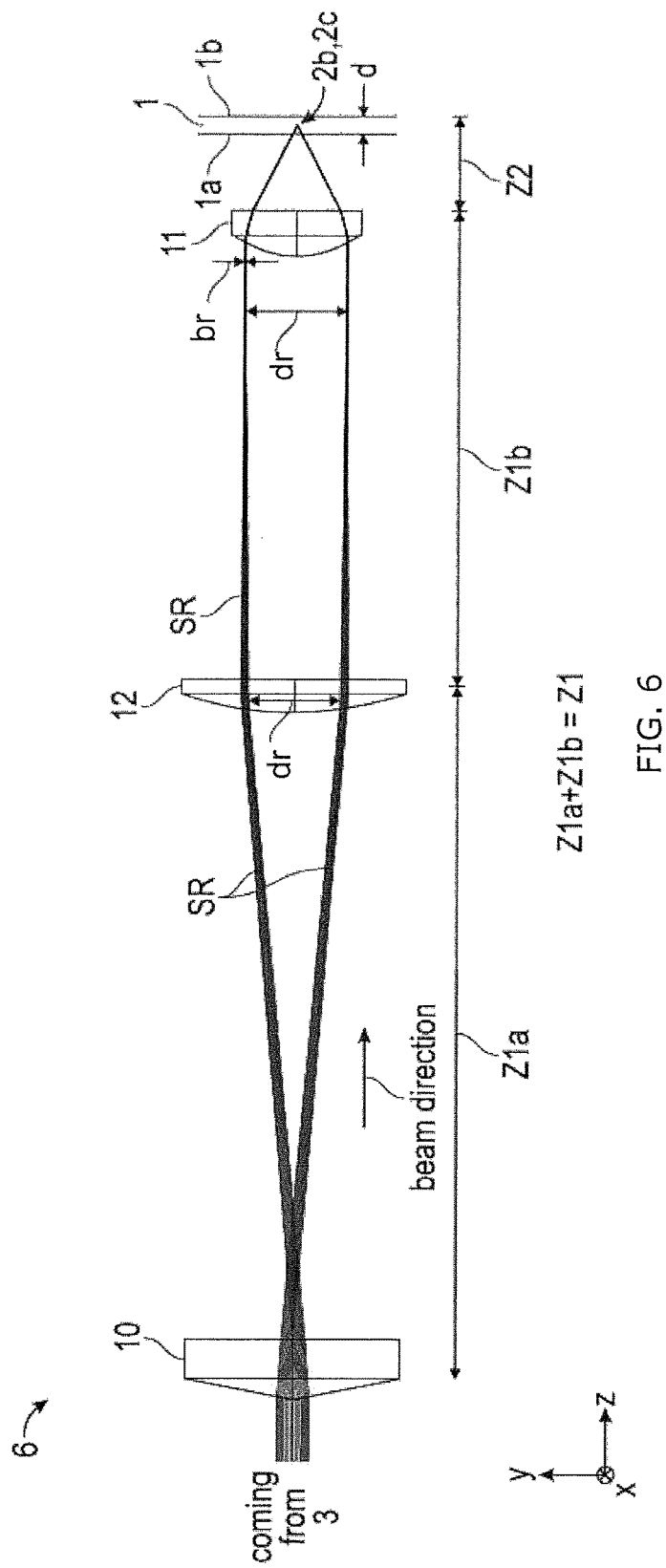
FIG. 6 is a schematic illustration of a fourth optical assembly for laser drilling.

Turning to FIG. 6, both effects can be avoided by inserting another lens, a collimating lens 12 in the optical assembly 6. The additional positive lens 12 serves to adjust the circular illumination of focusing lens 11 very tightly. The focal length f' of collimating lens 12 is selected in such a way that the desired circle diameter dr results from distance Z1 a from the axicon to the collimating lens 12, which is equal to f'. The desired width br of the ring can be adjusted via the distance Z1b (collimating lens 12 to focusing lens 11). As a matter of pure geometry, the small width of the circular illumination leads to a short focal line. A minimum can be achieved at distance f'.

The optical assembly 6 depicted in FIG. 6 is thus based on the one depicted in FIG. 5A so that only the differences are described below. The collimating lens 12, here also designed as a plano-convex lens (with its curvature towards the beam direction) is additionally placed centrally in the beam path between axicon 10 (with its apex towards the beam direction), on the one side, and the plano-convex lens 11, on the other side. The distance of collimating lens 12 from axicon 10 is referred to as Z1a, the distance of focusing lens 11 from collimating lens 12 as Z1b, and the distance of the focal line 2b from the focusing lens 11 as Z2 (always viewed in beam direction). As shown in FIG. 6, the circular radiation SR formed by axicon 10, which is incident divergently and under the circle diameter dr on the collimating lens 12, is adjusted to the required circle width br along the distance Z1b for an at least approximately constant circle diameter dr at the focusing lens 11. In the case shown, a very short focal line 2b is intended to be generated so that the circle width br of approximately 4 mm at lens 12 is reduced to approximately 0.5 mm at lens 11 due to the focusing properties of lens 12 (circle diameter dr is 22 mm in the example).

In the depicted example, it is possible to achieve a length of the focal line 1 of less than 0.5 mm using a typical laser beam diameter of 2 mm, a focusing lens 11 with a focal length f=25 mm, and a collimating lens with a focal length f'=150 mm, and choosing Z1a=Z1b=140 mm and Z2=15 mm.

Once the fault lines are created, separation can occur via: 1) manual or mechanical stress on or around the fault line; the stress or pressure should create tension that pulls both sides of the fault line apart to break the areas that are still bonded together; 2) using a heat source to create a thermal stress zone around the fault line to put the defect line in tension and induce partial or total separation along the fault line; and 3) using an ion exchange process to introduce stress in the region around the fault line. Additionally, the use of the picosecond laser process on either non-chamfered edges or incompletely chamfered edges, but that have "sacrificial" regions that control damage caused by edge impact is described below.

The second method takes advantage of an existing edge to create a chamfer by applying a focused (typically $CO_2$) laser very close to the intersection between the surfaces of the edge and substrate. The laser beam must be highly absorbed by the substrate material to create a temperature gradient that spans the interval extending from the material's melting temperature down to its strain point. This thermal gradient generates a stress profile that results in separation or peeling of a very thin strip of the material. The thin strip of material curls and peels off from the bulk of the material and has dimensions determined by the depth of the region defined between the strain and softening zones. This method can be combined with the previous method to peel the thin strip of material off at planes dictated by the fault lines. In this embodiment, the thermal gradient is established in the vicinity of the fault line. The combination of thermal gradient and fault line can yield better control of the chamfer edge shape and surface texture than would otherwise be possible by using purely thermal means.

Figure 7A:
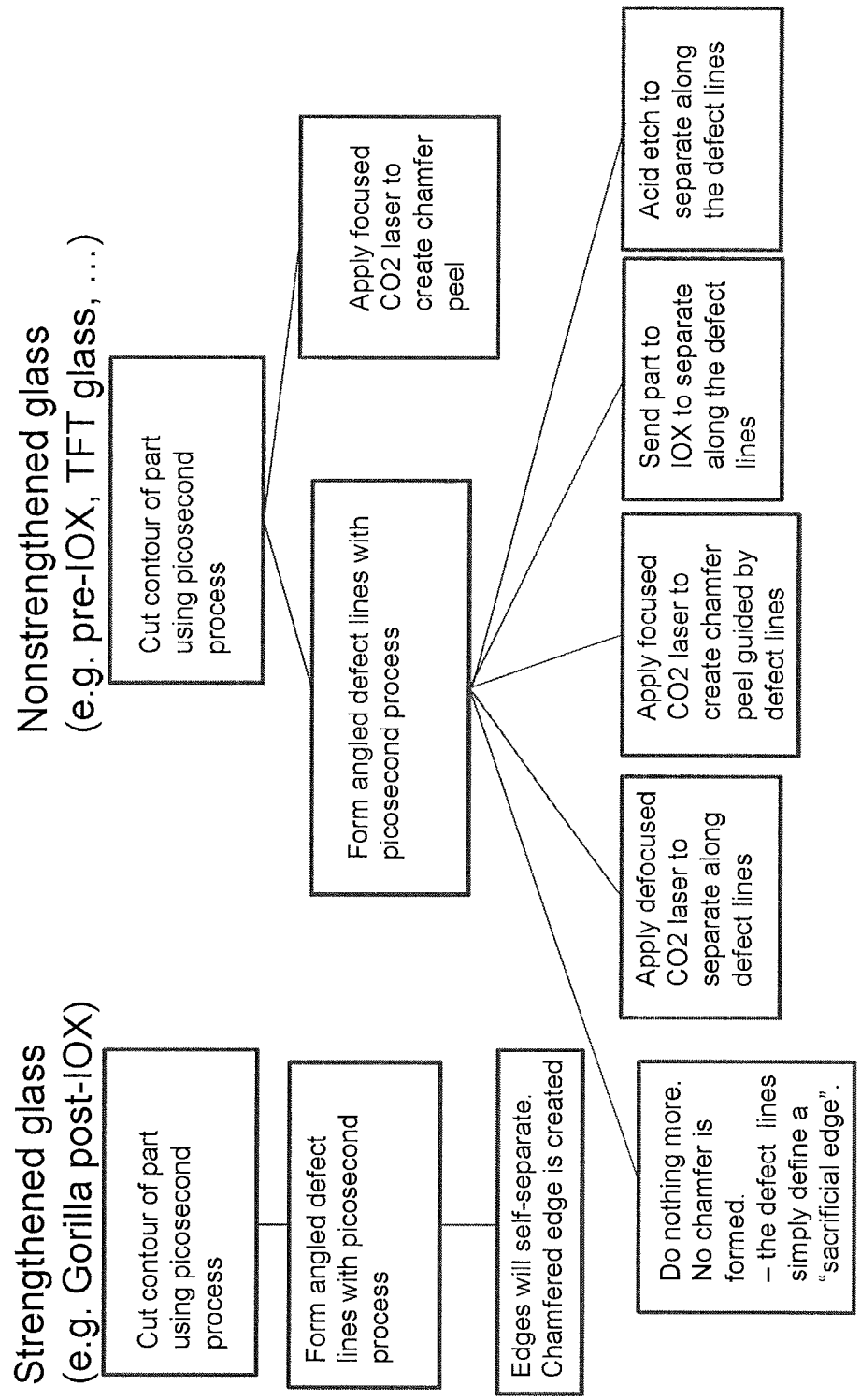
FIG. 7A is a flow chart of the various methods described in the present application to form a more robust edge—creating chamfers and sacrificial edges.

FIG. 7A gives an overview of the processes described in the present application.

One method relies on induced nonlinear absorption to create fault lines as described hereinabove for forming the desired shapes of parts and edges using a short-pulse laser. The process relies on the material transparency to the laser wavelength in the linear regime (low laser intensity), which provides high surface and edge quality with reduced subsurface damage created by the area of high intensity around the laser focus. One of the key enablers of this process is the high aspect ratio of the defect line created by the ultra-short pulsed laser. It allows creation of a fault line with long and deep defect line that can extend from the top to the bottom surfaces of the material to be cut and chamfered. In principle, each defect line (perforation) can be created by a single pulse and if desired, additional pulses can be used to increase the extension of the affected area (depth and width).

Figure 7B:
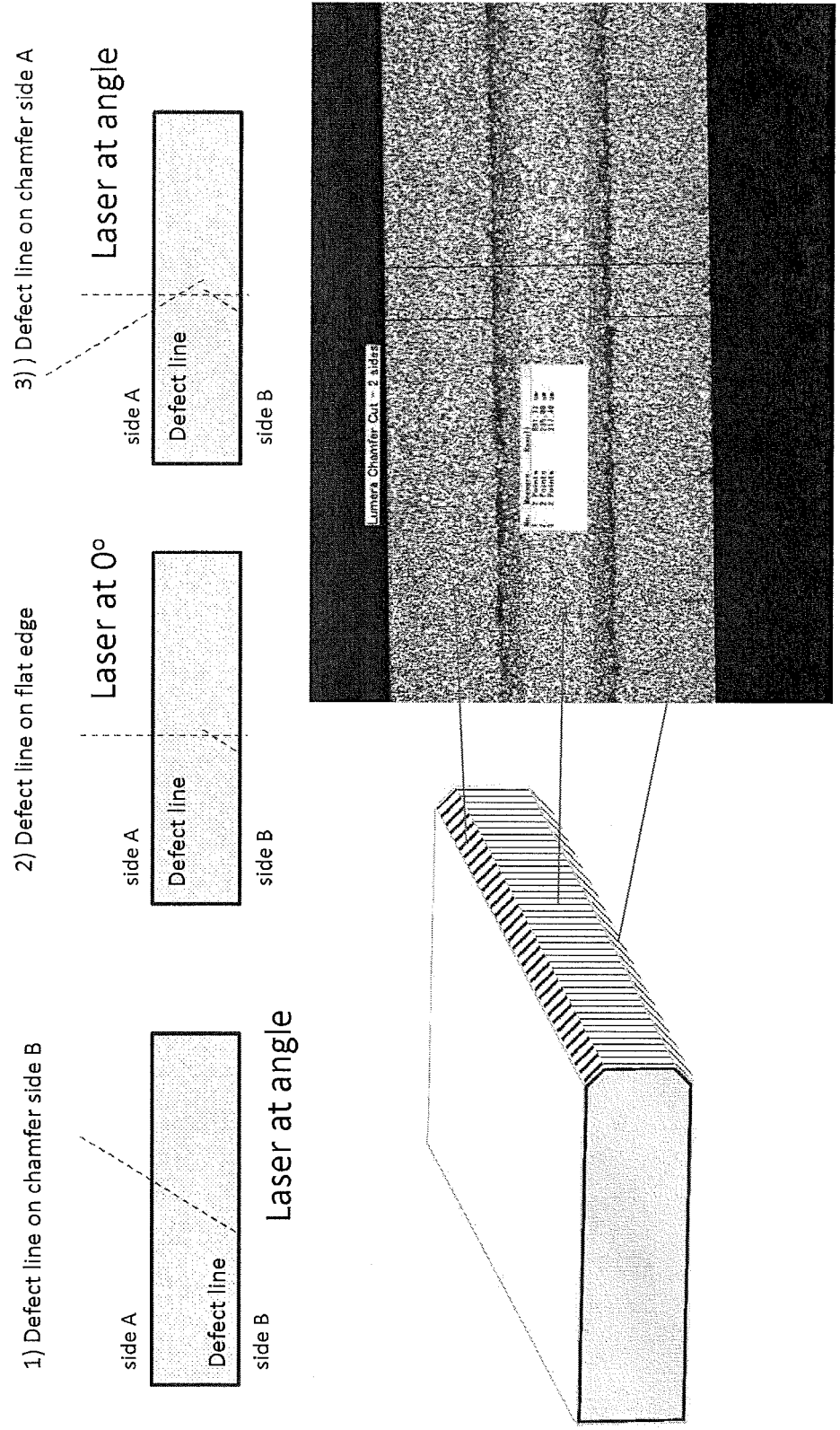
FIG. 7B illustrates a process of creating a chamfered edge with defect lines.
Figure 7C:
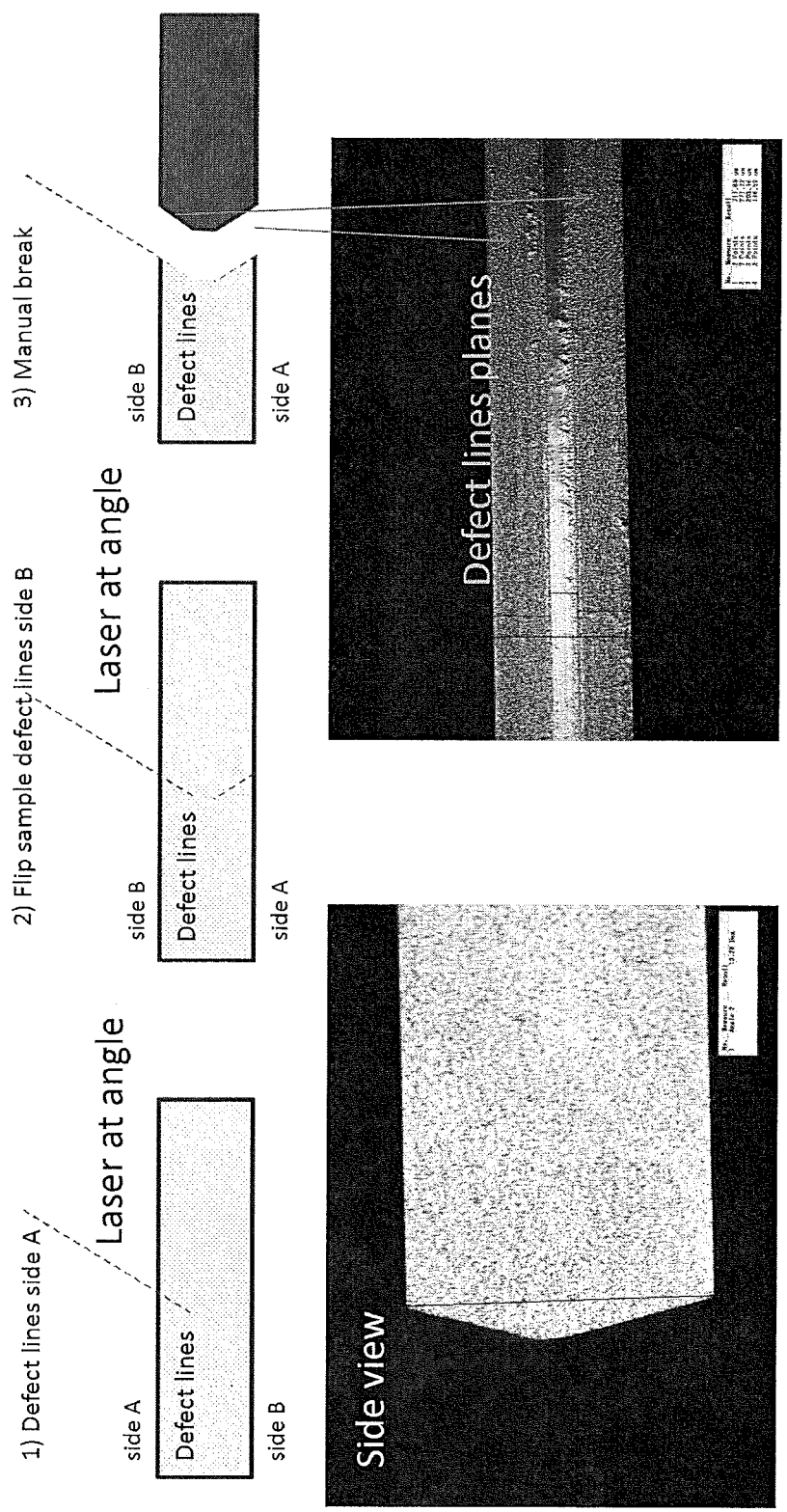
FIG. 7C illustrates laser chamfering of glass edges using a focused and angled ultrashort laser that generates defect lines along pre-determined planes. Top shows an example using 3 defect line planes compared to just two for the bottom images.

Using the same principle illustrated in FIGS. 1A-1C to separate a glass substrate with flat edges, the process to produce chamfered edges can be modified as illustrated in FIG. 7B. To separate and form a chamfered edge, three separate planes of defect lines that intersect and define the boundaries of the desired edge shape can be formed in the material. Different shapes can be created by using just two intersecting defect line planes as illustrated in FIG. 7C, but the interior flat part of the edge may need to be broken or separated without any defect lines (e.g. through mechanical or thermal means).

Laser and Optical System:

For the purpose of cutting glass or other transparent brittle materials, a process was developed that uses a 1064 nm picosecond laser in combination with line-focus beam forming optics to create defect lines in substrates. A sample Corning® Gorilla® Glass code 2320 substrate with 0.7 mm thickness was positioned so that it was within the line-focus. With a line-focus of ~1 mm extension, and a picosecond laser that produces output power of ~>30 W at a repetition rate of 200 kHz (~150 µJ/pulse), then the optical intensities in the line region can easily be high enough to create non-linear absorption in the material. A region of damaged, ablated, vaporized, or otherwise modified material is created that approximately follows the linear region of high intensity.

Note that the typical operation of such a picosecond laser creates a "burst" of pulses. Each "burst" may contain multiple sub-pulses of very short duration (~10 psec). Each sub-pulse is separated in time by approximately 20 nsec (50 MHz), with the time often governed by the laser cavity design. The time between each "burst" will be much longer, often ~5 µsec, for a laser repetition rate of ~200 kHz. The exact timings, pulse durations, and repetition rates can vary depending on the laser design. But short pulses (<15 psec) of high intensity have been shown to work well with this technique.

Figure 8A:
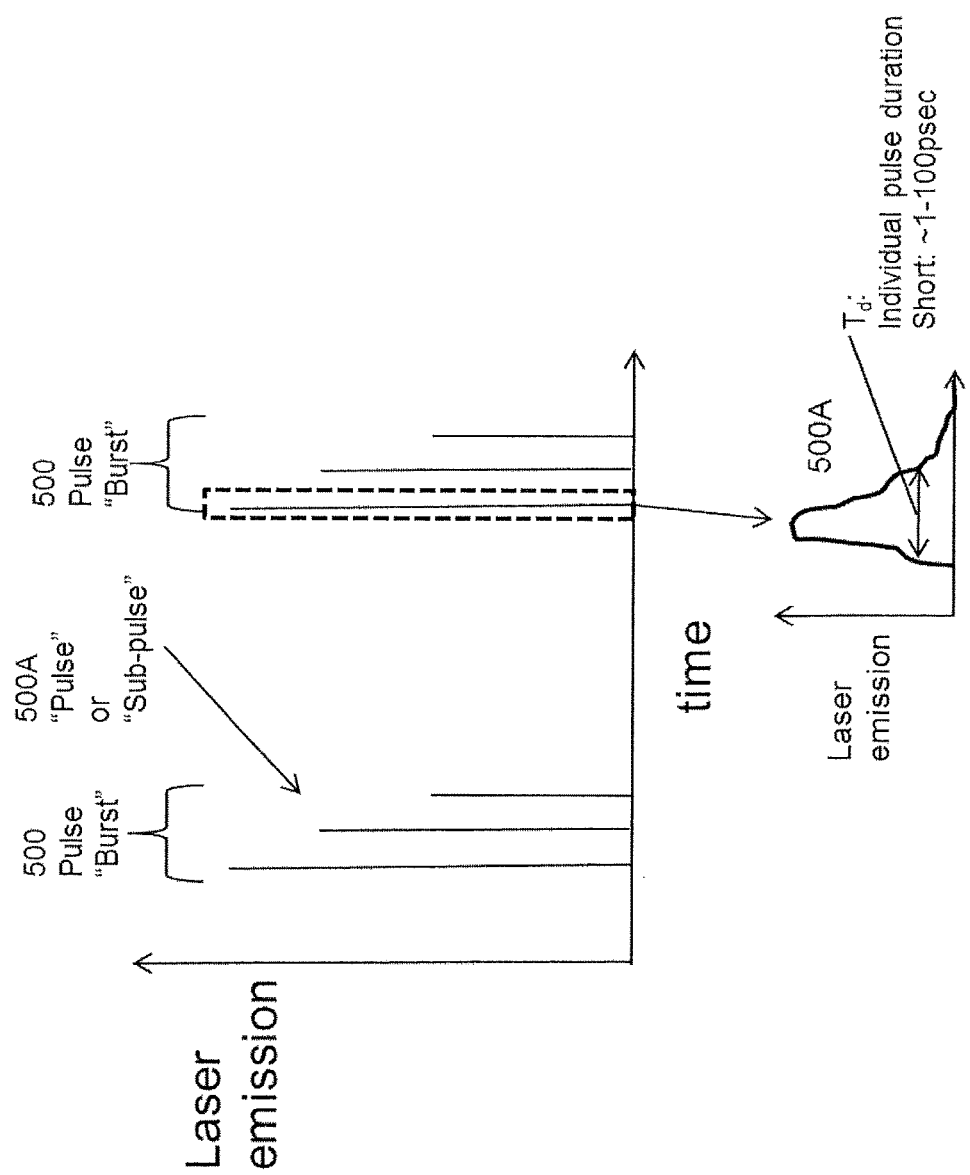
FIGS. 8A and 8B depict laser emission as a function of time for a picosecond laser. Each emission is characterized by a pulse "burst" which may contain one or more sub-pulses. Times corresponding to pulse duration, separation between pulses, and separation between bursts are illustrated.
Figure 8B:
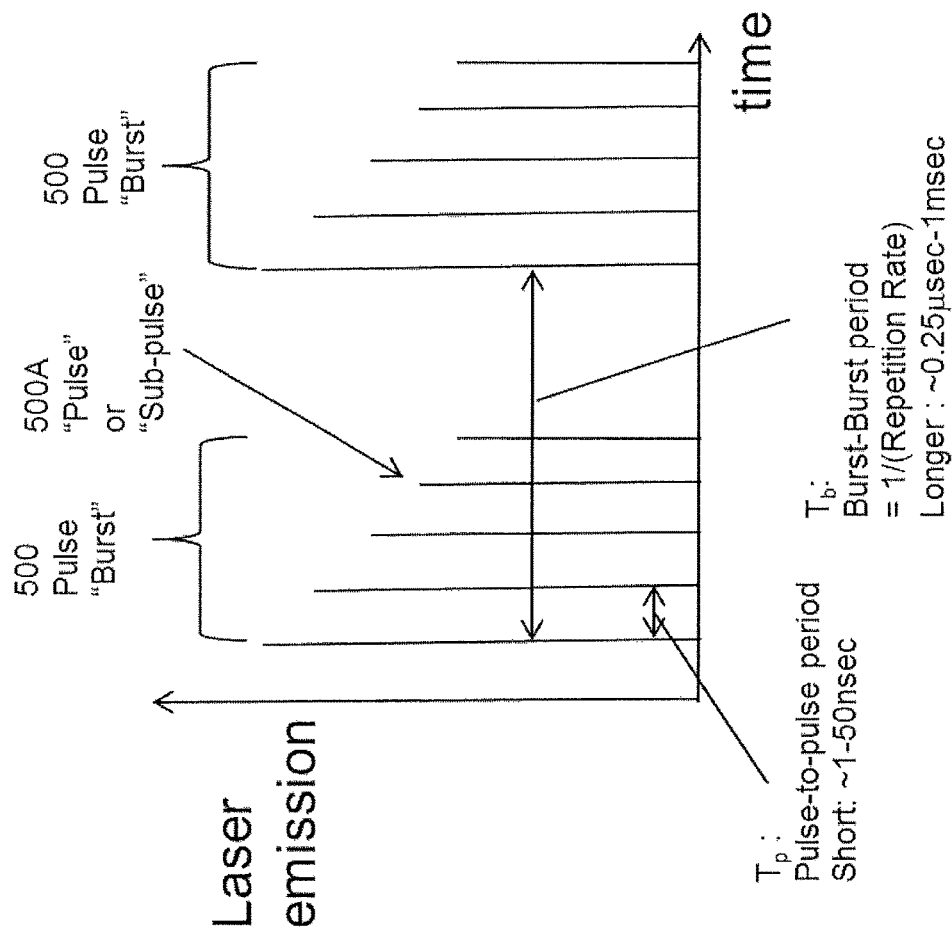

More specifically, as illustrated in FIGS. 8A and 8B, according to selected embodiments described herein, the picosecond laser creates a "burst" 500 of pulses 500A, sometimes also called a "burst pulse". Bursting is a type of laser operation where the emission of pulses is not in a uniform and steady stream but rather in tight clusters of pulses [See reference]. Each "burst" 500 may contain multiple pulses 500A (such as 2 pulses, 3 pulses, 4 pulses, 5 pulses, 10, 15, 20, or more) of very short duration $T_d$ up to 100 psec (for example, 0.1 psec, 5 psec, 10 psec, 15 psec, 18 psec, 20 psec, 22 psec, 25 psec, 30 psec, 50 psec, 75 psec, or therebetween). The pulse duration is generally in a range from about 1 psec to about 1000 psec, or in a range from about 1 psec to about 100 psec, or in a range from about 2 psec to about 50 psec, or in a range from about 5 psec to about 20 psec. These individual pulses 500A within a single burst 500 can also be termed "sub-pulses," which simply denotes the fact that they occur within a single burst of pulses. The energy or intensity of each laser pulse 500A within the burst may not be equal to that of other pulses within the burst, and the intensity distribution of the multiple pulses within a burst 500 may follow an exponential decay in time governed by the laser design. Preferably, each pulse 500A within the burst 500 of the exemplary embodiments described herein are separated in time from the subsequent pulse in the burst by a duration $T_p$ from 1 nsec to 50 nsec (e.g. 10-50 nsec, or 10-40 nsec, or 10-30 nsec, with the time often governed by the laser cavity design. For a given laser, the time separation $T_p$ between each pulses (pulse-to-pulse separation) within a burst 500 is relatively uniform (±10%). For example, in some embodiments, each pulse is separated in time from the subsequent pulse by approximately 20 nsec (50 MHz pulse repetition frequency). For example, for a laser that produces pulse-to-pulse separation $T_p$ of about 20 nsec, the pulse-to-pulse separation $T_p$ within a burst is maintained within about ±10%, or is about ±2 nsec. The time between each "burst" (i.e., time separation $T_b$ between bursts) will be much longer (e.g., $0.25 \leq T_b \leq 1000$ microseconds, for example 1-10 microseconds, or 3-8 microseconds,) For example in some of the exemplary embodiments of the laser described herein it is around 5 microseconds for a laser repetition rate or frequency of about 200 kHz. The laser repetition rate is also referred to as burst repetition frequency or burst repetition rate herein, and is defined as the time between the first pulse in a burst to the first pulse in the subsequent burst. In other embodiments, the burst repetition frequency is in a range of between about 1 kHz and about 4 MHz, or in a range between about 1 kHz and about 2 MHz, or in a range of between about 1 kHz and about 650 kHz, or in a range of between about 10 kHz and about 650 kHz. The time $T_b$ between the first pulse in each burst to the first pulse in the subsequent burst may be 0.25 microsecond (4 MHz burst repetition rate) to 1000 microseconds (1 kHz burst repetition rate), for example 0.5 microseconds (2 MHz burst repetition rate) to 40 microseconds (25 kHz burst repetition rate), or 2 microseconds (500 kHz burst repetition rate) to 20 microseconds (50 kHz burst repetition rate). The exact timings, pulse durations, and repetition rates can vary depending on the laser design and user-controllable operating parameters. Short pulses ($T_d$<20 psec and preferably $T_d \leq 15$ psec) of high intensity have been shown to work well.

The required energy to modify the material can be described in terms of the burst energy—the energy contained within a burst (each burst 500 contains a series of pulses 500A), or in terms of the energy contained within a single laser pulse (many of which may comprise a burst). For these applications, the energy per burst (per millimeter of the material to be cut) can be from 10-2500 µJ, or from 20-1500 µJ, or from 25-750 µJ, or from 40-2500 µJ, or from 100-1500 µJ, or from 200-1250 µJ, or from 250-1500 µJ, or from 250-750 µJ. The energy of an individual pulse within the burst will be less, and the exact individual laser pulse energy will depend on the number of pulses 500A within the burst 500 and the rate of decay (e.g, exponential decay rate) of the laser pulses with time as shown in FIGS. 8A and 8B. For example, for a constant energy/burst, if a pulse burst contains 10 individual laser pulses 500A, then each individual laser pulse 500A will contain less energy than if the same burst pulse 500 had only 2 individual laser pulses.

The use of lasers capable of generating such pulse bursts is advantageous for cutting or modifying transparent materials, for example glass. In contrast with the use of single pulses spaced apart in time by the repetition rate of a single-pulsed laser, the use of a burst pulse sequence that spreads the laser energy over a rapid sequence of pulses within burst 500 allows access to larger timescales of high intensity interaction with the material than is possible with single-pulse lasers. While a single-pulse can be expanded in time, conservation of energy dictates that as this is done, the intensity within the pulse must drop as roughly one over the pulse width. Hence if a 10 psec single pulse is expanded to a 10 nsec pulse, the intensity drops by roughly three orders of magnitude. Such a reduction can reduce the optical intensity to the point where non-linear absorption is no longer significant and the light-material interaction is no longer strong enough to allow for cutting. In contrast, with a burst pulse laser, the intensity during each pulse or sub-pulse 500A within the burst 500 can remain very high—for example three pulses 500A with pulse duration $T_d$ 10 psec that are spaced apart in time by a separation $T_p$ of approximately 10 nsec still allows the intensity within each pulse to be approximately three times higher than that of a single 10 psec pulse, while the laser is allowed to interact with the material over a timescale that is three orders of magnitude larger. This adjustment of multiple pulses 500A within a burst thus allows manipulation of timescale of the laser-material interaction in ways that can facilitate greater or lesser light interaction with a pre-existing plasma plume, greater or lesser light-material interaction with atoms and molecules that have been pre-excited by an initial or previous laser pulse, and greater or lesser heating effects within the material that can promote the controlled growth of defect lines (perforations). The amount of burst energy required to modify the material will depend on the substrate material composition and the length of the line focus used to interact with the substrate. The longer the interaction region, the more the energy is spread out, and the higher the burst energy that will be required.)

A defect line or a hole is formed in the material when a single burst of pulses strikes essentially the same location on the glass. That is, multiple laser pulses within a single burst can produce a single defect line or a hole location in the glass. Of course, if the glass is translated (for example by a constantly moving stage) or the beam is moved relative to the glass, the individual pulses within the burst cannot be at exactly the same spatial location on the glass. However, they are well within 1 μm of one another—i.e., they strike the glass at essentially the same location. For example, they may strike the glass at a spacing sp where 0<sp≤500 nm from one another. For example, when a glass location is hit with a burst of 20 pulses the individual pulses within the burst strike the glass within 250 nm of each other. Thus, in some embodiments 1 nm<sp<250 nm. In in some embodiments 1 nm<sp <100 nm.

Hole or Damage Track Formation:

If the substrate has sufficient stress (e.g. with ion exchanged glass), then the part will spontaneously separate along the fault line traced out by the laser process. However, if there is not a lot of stress inherent to the substrate, then the picosecond laser will simply form defect lines in the substrate. These defect lines may take the form of holes with interior dimensions (diameters) ~0.5-1.5 μm.

The holes or defect lines may or may not perforate the entire thickness of the material, and may or may not be a continuous opening throughout the depth of the material. FIG. 1C shows an example of such tracks perforating the entire thickness of a piece of 700 μm thick unstrengthened Gorilla® Glass substrate. The perforations or damage tracks are observed through the side of a cleaved edge. The tracks through the material are not necessarily through holes—there may be regions of glass that plug the holes, but they are generally small in size.

Note that upon separation at the fault line, fracture occurs along the defect lines to provide a part or edge having a surface with features derived from the defect lines. Before separation, the defect lines are generally cylindrical in shape. Upon separation, the defect lines fracture and remnants of the defect lines are evident in the contours of the surface of the separated part or edge. In an ideal model, the defect lines are cleaved in half upon separation so that the surface of the separated part or edge includes serrations corresponding to half-cylinders. In practice, separation may deviate from an ideal model and the serrations of the surface may be an arbitrary fraction of the shape of the original defect line. Irrespective of the particular form, features of the separated surface will be referred to as defect lines to indicate the origin of their existence.

The lateral spacing (pitch) between the defect lines is determined by the pulse rate of the laser as the substrate is translated underneath the focused laser beam. Only a single picosecond laser pulse or burst is necessary to form an entire hole, although multiple pulses or bursts may be used if desired. To form defect lines at different pitches, the laser can be triggered to fire at longer or shorter intervals. For cutting operations, the laser triggering generally is synchronized with the stage driven motion of the part beneath the beam, so laser pulses are triggered at a fixed interval, such as every 1 μm, or every 5 μm. The exact spacing between adjacent defect lines is determined by the material properties that facilitate crack propagation from perforation to perforation, given the stress level in the substrate. Instead of cutting a substrate, it is also possible to use the same method to only perforate the material. In this case, the defect lines may be separated by larger spacings (e.g. 5 μm pitch or greater).

The laser power and lens focal length (which determines the focal line length and hence power density) are particularly important to ensure full penetration of the glass and low surface and sub-surface damage.

In general, the higher the available laser power, the faster the material can be cut with the above process. The process(es) disclosed herein can cut glass at a cutting speed of 0.25 m/sec, or faster. A cut speed (or cutting speed) is the rate the laser beam moves relative to the surface of the substrate material (e.g., glass) while creating multiple defect lines holes. High cut speeds, such as, for example 400 mm/sec, 500 mm/sec, 750 mm/sec, 1 m/sec, 1.2 m/sec, 1.5 m/sec, or 2 m/sec, or even 3.4 m/sec to 4 m/sec are often desired in order to minimize capital investment for manufacturing, and to optimize equipment utilization rate. The laser power is equal to the burst energy multiplied by the burst repetition frequency (rate) of the laser. In general, to cut glass materials at high cutting speeds, the defect lines are typically spaced apart by 1-25 μm, in some embodiments the spacing is preferably 3 μm or larger—for example 3-12 μm, or for example 5-10 μm.

For example, to achieve a linear cutting speed of 300 mm/sec, 3 μm hole pitch corresponds to a pulse burst laser with at least 100 kHz burst repetition rate. For a 600 mm/sec cutting speed, a 3 μm pitch corresponds to a burst-pulsed laser with at least 200 kHz burst repetition rate. A pulse burst laser that produces at least 40 μJ/burst at 200 kHz, and cuts at a 600 mm/s cutting speed needs to have a laser power of at least 8 Watts. Higher cut speeds require accordingly higher laser powers.

For example, a 0.4 m/sec cut speed at 3 μm pitch and 40 μJ/burst would require at least a 5 W laser, a 0.5 m/sec cut speed at 3 μm pitch and 40 μJ/burst would require at least a 6 W laser. Thus, preferably the laser power of the pulse burst ps laser is 6 W or higher, more preferably at least 8 W or higher, and even more preferably at least 10 W or higher. For example, in order to achieve a 0.4 m/sec cut speed at 4 μm pitch (defect line spacing, or damage tracks spacing) and 100 μJ/burst, one would require at least a 10 W laser, and to achieve a 0.5 m/sec cut speed at 4 μm pitch and 100 μJ/burst, one would require at least a 12 W laser. For example, a to achieve a cut speed of 1 m/sec at 3 μm pitch and 40 μJ/burst, one would require at least a 13 W laser. Also, for example, 1 m/sec cut speed at 4 μm pitch and 400 μJ/burst would require at least a 100 W laser.

The optimal pitch between defect lines (damage tracks) and the exact burst energy is material dependent and can be determined empirically. However, it should be noted that raising the laser pulse energy or making the damage tracks at a closer pitch are not conditions that always make the substrate material separate better or with improved edge quality. A pitch that is too small (for example <0.1 micron, or in some exemplary embodiments <1 μm, or in other embodiments <2 μm) between defect lines (damage tracks)

can sometimes inhibit the formation of nearby subsequent defect lines (damage tracks), and often can inhibit the separation of the material around the perforated contour. An increase in unwanted micro cracking within the glass may also result if the pitch is too small. A pitch that is too long (e.g. >50 µm, and in some glasses >25 µm or even >20 µm) may result in "uncontrolled microcracking"—i.e., where instead of propagating from defect line to defect line along the intended contour, the microcracks propagate along a different path, and cause the glass to crack in a different (undesirable) direction away from the intended contour. This may ultimately lower the strength of the separated part since the residual microcracks constitute flaws that weaken the glass. A burst energy for forming defect lines that is too high (e.g., >2500 µJ/burst, and in some embodiments >500 µJ/burst) can cause "healing" or re-melting of previously formed defect lines, which may inhibit separation of the glass. Accordingly, it is preferred that the burst energy be <2500 µJ/burst, for example, ≤500 µJ/burst. Also, using a burst energy that is too high can cause formation of microcracks that are extremely large and create structural imperfections that can reduce the edge strength of the part after separation. A burst energy that is too low (e.g. <40 µJ/burst) may result in no appreciable formation of defect lines within the glass, and hence may necessitate especially high separation force or result in a complete inability to separate along the perforated contour.

Typical exemplary cutting rates (speeds) enabled by this process are, for example, 0.25 m/sec and higher. In some embodiments, the cutting rates are at least 300 mm/sec. In some embodiments, the cutting rates are at least 400 mm/sec, for example, 500 mm/sec to 2000 mm/sec, or higher. In some embodiments the picosecond (ps) laser utilizes pulse bursts to produce defect lines with periodicity between 0.5 µm and 13 µm, e.g. between 0.5 and 3 µm. In some embodiments, the pulsed laser has laser power of 10 W-100 W and the material and/or the laser beam are translated relative to one another at a rate of at least 0.25 m/sec; for example, at the rate of 0.25 m/sec to 0.35 m/sec, or 0.4 m/sec to 5 m/sec. Preferably, each pulse burst of the pulsed laser beam has an average laser energy measured at the workpiece greater than 40 µJ per burst per mm thickness of workpiece. Preferably, each pulse burst of the pulsed laser beam has an average laser energy measured at the workpiece greater of less than 2500 µJ per burst per mm thickness of workpiece, and preferably lass than about 2000 µJ per burst per mm thickness of workpiece, and in some embodiments less than 1500 µJ per burst per mm thickness of workpiece; for example, not more than 500 µJ per burst per mm thickness of workpiece.

We discovered that much higher (5 to 10 times higher) volumetric pulse energy density ($\mu J/\mu m^3$) is required for perforating alkaline earth boroaluminosilicate glasses with low or no alkali content. This can be achieved, for example, by utilizing pulse burst lasers, preferably with at least 2 pulses per burst and providing volumetric energy densities within the alkaline earth boroaluminosilicate glasses (with low or no alkali) of about 0.05 $\mu J/\mu m^3$ or higher, e.g., at least 0.1 $\mu J/\mu m^3$, for example 0.1-0.5 $\mu J/\mu m^3$.

Accordingly, it is preferable that the laser produces pulse bursts with at least 2 pulses per burst. For example, in some embodiments the pulsed laser has a power of 10 W-150 W (e.g., 10 W-100 W) and produces pulse bursts with at least 2 pulses per burst (e.g., 2-25 pulses per burst). In some embodiments the pulsed laser has a power of 25 W-60 W, and produces pulse bursts with at least 2-25 pulses per burst, and periodicity or distance between the adjacent defect lines produced by the laser bursts is 2-10 µm. In some embodiments, the pulsed laser has a power of 10 W-100 W, produces pulse bursts with at least 2 pulses per burst, and the workpiece and the laser beam are translated relative to one another at a rate of at least 0.25 m/sec. In some embodiments the workpiece and/or the laser beam are translated relative to one another at a rate of at least 0.4 m/sec.

For example, for cutting 0.7 mm thick non-ion exchanged Corning code 2319 or code 2320 Gorilla® glass, it is observed that pitches of 3-7 µm can work well, with pulse burst energies of about 150-250 µJ/burst, and burst pulse numbers that range from 2-15, and preferably with pitches of 3-5 µm and burst pulse numbers (number of pulses per burst) of 2-5.

At 1 m/sec cut speeds, the cutting of Eagle XG® glass typically requires utilization of laser powers of 15-84 W, with 30-45 W often being sufficient. In general, across a variety of glass and other transparent materials, applicants discovered that laser powers between 10 W and 100 W are preferred to achieve cutting speeds from 0.2-1 m/sec, with laser powers of 25-60 W being sufficient (or optimum) for many glasses. For cutting speeds of 0.4 m/sec to 5 m/sec, laser powers should preferably be 10 W-150 W, with burst energy of 40-750 µJ/burst, 2-25 bursts per pulse (depending on the material that is cut), and defect line separation (pitch) of 3 to 15 µm, or 3-10 µm. The use of picosecond pulse burst lasers would be preferable for these cutting speeds because they generate high power and the required number of pulses per burst. Thus, according to some exemplary embodiments, the pulsed laser produces 10 W-100 W of power, for example 25 W to 60 W, and produces pulse bursts at least 2-25 pulses per burst and the distance between the defect lines is 2-15 µm; and the laser beam and/or workpiece are translated relative to one another at a rate of at least 0.25 m/sec, in some embodiments at least 0.4 m/sec, for example 0.5 m/sec to 5 m/sec, or faster.

Cutting and Separating Chamfered Edges:
Chamfer Method 1:

Different conditions were found that allow the separation of chamfered edges using unstrengthened Gorilla® Glass, specifically Corning code 2320. The first method is to use the picosecond laser to create defect lines to form a fault line consistent with the desired shape (in this case a chamfered edge). After this step, mechanical separation can be accomplished by using a breaking plier, manually bending the part, or any method that creates tension that initiates and propagates the separation along the fault line. To create chamfered edges with defect lines in 700 µm thick unstrengthened Gorilla® Glass and mechanically separate the parts, the best results were found for the following optics and laser parameters:

Picosecond Laser (1064 nm)
Input beam diameter to axicon lens ~2 mm
Axicon angle=10 degrees
Initial collimating lens focal length=125 mm
Final objective lens focal length=40 mm
Focus set to be at Z=0.7 mm (i.e. line focus set to be centered with regard to the glass thickness)
Laser power at 100% of full power (~40 Watts)
Burst repetition rate of the laser=200 kHz.
Energy per burst=200 µJ (40 W/200 kHz)
Pitch=5 µm
3 pulses/burst
Single pass per defect line An alternative method of achieving separation is to use a relatively defocused $CO_2$ laser beam (~2 mm spot diameter) that follows the picosecond laser step after the picosecond laser has finished tracing the desired contour. The thermal stress induced by the $CO_2$ laser is enough to initiate and propagate the separation or shaping of the edge along the desired contour. For this case, the best results were found for the following optics and laser parameters:

Picosecond Laser (1064 nm)
Input beam diameter to axicon lens ~2 mm
Axicon angle=10 degrees
Initial collimating lens focal length=125 mm
Final objective lens focal length=40 mm
Focus set to be at Z=0.7 mm (i.e. line focus set to be centered with regard to the glass thickness)
Laser power at 75% of full power (~30 Watts)
Burst repetition rate of the laser=200 kHz.
3 pulses/burst
Energy per burst=150 μJ (30 W/200 kHz)
Pitch=5 μm
Single pass
$CO_2$ Laser
Laser is a 200 W full power laser
Laser translation speed: 10 m/min
Laser power=100%
Pulse duration 17 μs
Laser modulation frequency 20 kHz
Laser duty cycle=17/50 μs=34% duty (about 68 Watt output).
Laser beam defocus (relative to the incident surface of the glass)=20 mm Chamfer Method 2:
Method 2A:

A second chamfering method takes advantage of an existing edge to create a chamfer by applying a highly-focused $CO_2$ laser very close to the intersection between the surfaces of the edge and substrate. In contrast to the $CO_2$ laser conditions described above, in this case the size of the focused $CO_2$ beam at the substrate surface is ~100 μm diameter, which allows the beam to heat the glass locally to much higher temperatures than the defocused beam described in Method 1. The laser must be highly absorbed by the substrate material to create an intense thermal gradient that spans the temperature range from the material's melting temperature down to the material's strain point. The thermal gradient generates a stress profile that induces separation or peeling of a very thin strip of the material that curls and peels off from the bulk of the material. The dimensions of the thin strip are determined by the depth of the region in the material having temperatures between the strain and softening points.

This method can be combined with the previous method to peel off at the planes dictated by the fault lines. In other words, a picosecond laser can be employed as described hereinabove to form a fault line having a shape consistent with the desired shape or contour of the edge and a thermal gradient can be established in and around the fault line to prompt release of the thin strip of material. In this embodiment, the fault lines produced by the picosecond laser guide the direction of curling or peeling of the thin strip of material and finer control of the shape or contour of the edge may be achieved.

Figure 9:
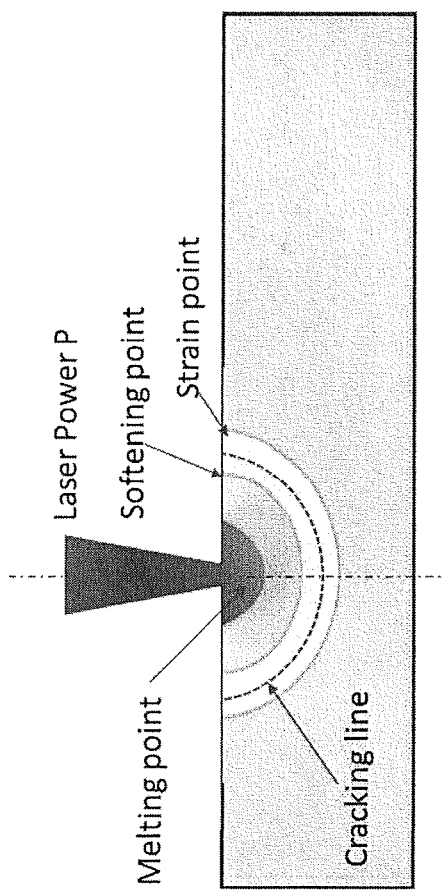
FIG. 9 is an illustration of a thermal gradient created by the focused laser that is highly absorbed by the glass. The cracking line is between the strain and softening zones.
Figure 10:
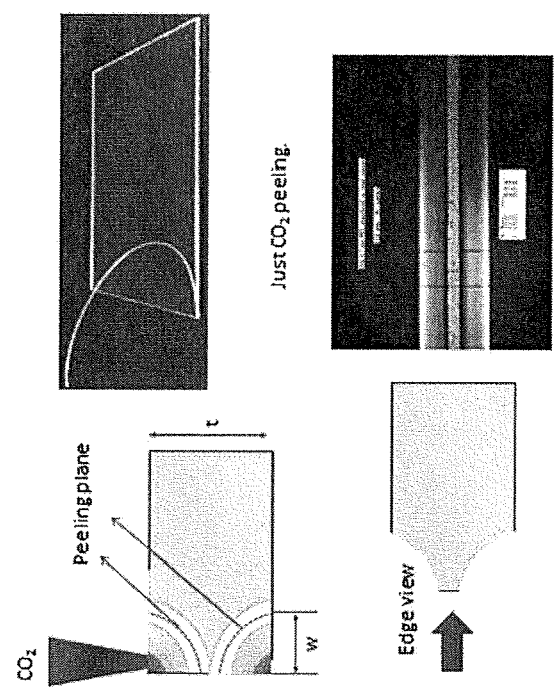
FIG. 10 illustrates edge chamfering by thermal peeling.
Figure 12:
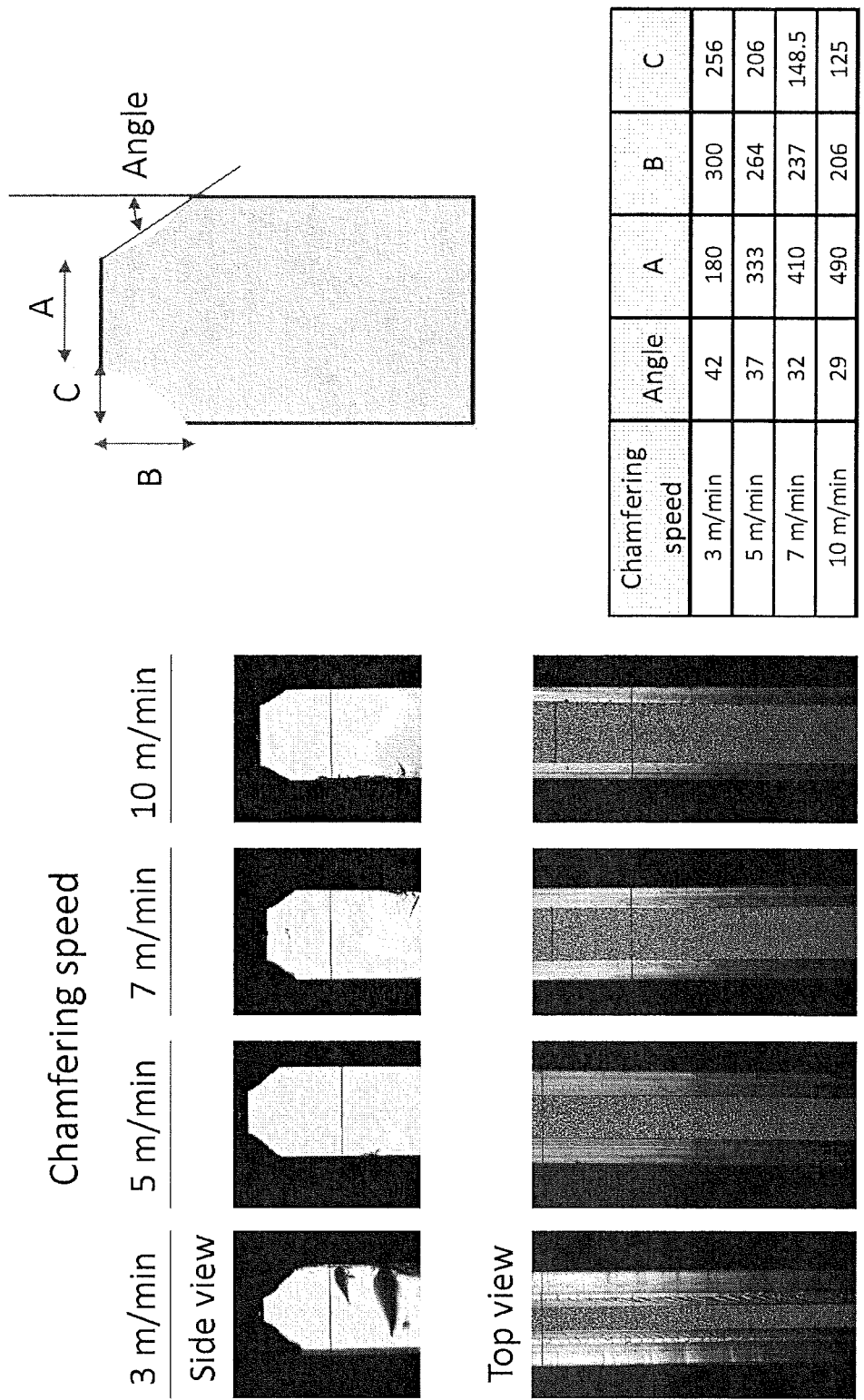
FIG. 12 is an illustration of edge chamfer changes with peeling speed using only a focused $CO_2$ laser. All other $CO_2$ laser parameters were kept the same.

As illustrated in FIG. 9, the second method relies on the absorption by the substrate of the laser wavelength (e.g., a $CO_2$ at 10.6 μm). Absorption of the laser by the material leads to the establishment of a thermal gradient that encompasses temperatures that extend from at least the strain point of the material to at least the softening point of the material. As shown in FIG. 10, a strip of glass separates from the bulk of the substrate to form a curled peel when such a thermal gradient is created. When the laser is tightly focused near the edge (e.g. within <100 μm from the edge) as shown in FIG. 9, a strip of curled glass is peeled from the right angle corner and forms a chamfer that is generally concave as shown in FIG. 10. To chamfer both corners, the sample can be flipped over and the process can be repeated on the second corner. As shown in FIG. 10, the defect lines of the flat portion of the edge show a texture consistent with that shown in FIG. 1C for a flat edge formed by through-hole perforations. FIG. 12 shows that by changing the chamfering speed (defined as the $CO_2$ beam scan speed), it is possible to change the characteristics of the chamfered edges: chamfer angle, width of the flat face (A) or height/width (B/C). By changing the $CO_2$ laser scan speed, the rate of laser energy deposition onto the material varies and the characteristics of the thermal gradient (e.g. spatial extent, temperature range) are changed. By moving the laser faster, the fault line becomes shallower and the strip of material that peels becomes narrower and shallower. The chamfering speed was varied from 3 m/min to 10 m/min in the examples shown in FIG. 12. The $CO_2$ laser had a peak power of 200 W and was set to a repetition rate of 30 kHz with a pulse width of 2.9 μs, which created a $CO_2$ output power governed by the ~9% duty cycle of ~18 W.

Figure 11A:
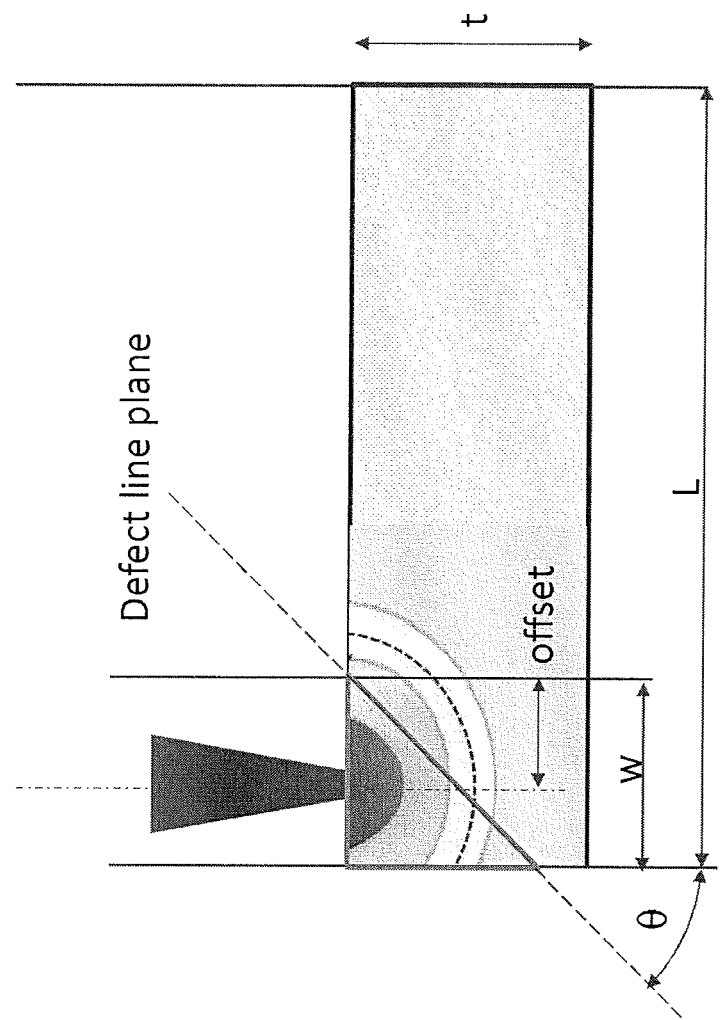
FIG. 11A is an illustration of edge chamfering process using defect lines and then thermal peeling. First, the picosecond laser is focused at an angle and a defect line is created on an angled plane. Then a focused $CO_2$ laser is scanned next to the defect line, at a controlled lateral offset. A strip of glass is peeled from that corner and forms a chamfer.
Figure 11B:
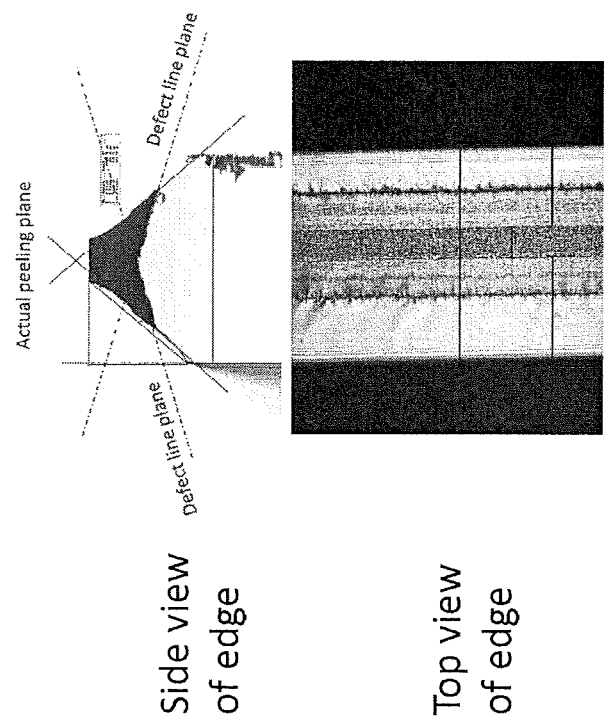
FIG. 11B illustrates, as shown in the side view of the edge, that the strip of glass formed by the process shown in FIG. 11A does not necessarily peel entirely along the defect line plane.

$CO_2$ Laser Conditions for Peel
Laser is a 200 W full power laser
Laser translation speed: 3 m/min (50 mm/s)
Laser power=100%
Pulse duration 2.9 μs
Laser modulation frequency 30 kHz
Laser duty cycle=2.9/33 μs=9% duty (about 18 W output).
Laser beam defocus=0.7 mm Method 2B:

In this example, the picosecond perforation portion of Chamfer Method 1 was combined with the thermal peeling of Chamfer Method 2A to create a controlled peeling with separation guided by the defect line planes. As shown in FIGS. 11A and 11B, peeling of the right angle corners occurs. Peeling and detachment may not, however, occur entirely along the defect plane because the thermal gradient in the softening zone provides a secondary driving force that may influence the path of detachment. Depending on the relative position between the defect plane and the cracking line defined by the thermal gradient, separation may occur to a greater or lesser extent along the fault line. FIG. 11B illustrates an example in which a portion of the peeling path deviates from the path defined by the defect lines. The deviation is most pronounced along the flat portion of the edge. It should be possible, however, to separate the corner at the defect line plane with the proper combination of defect line characteristics and proper heating with the $CO_2$ laser.

Figure 13:
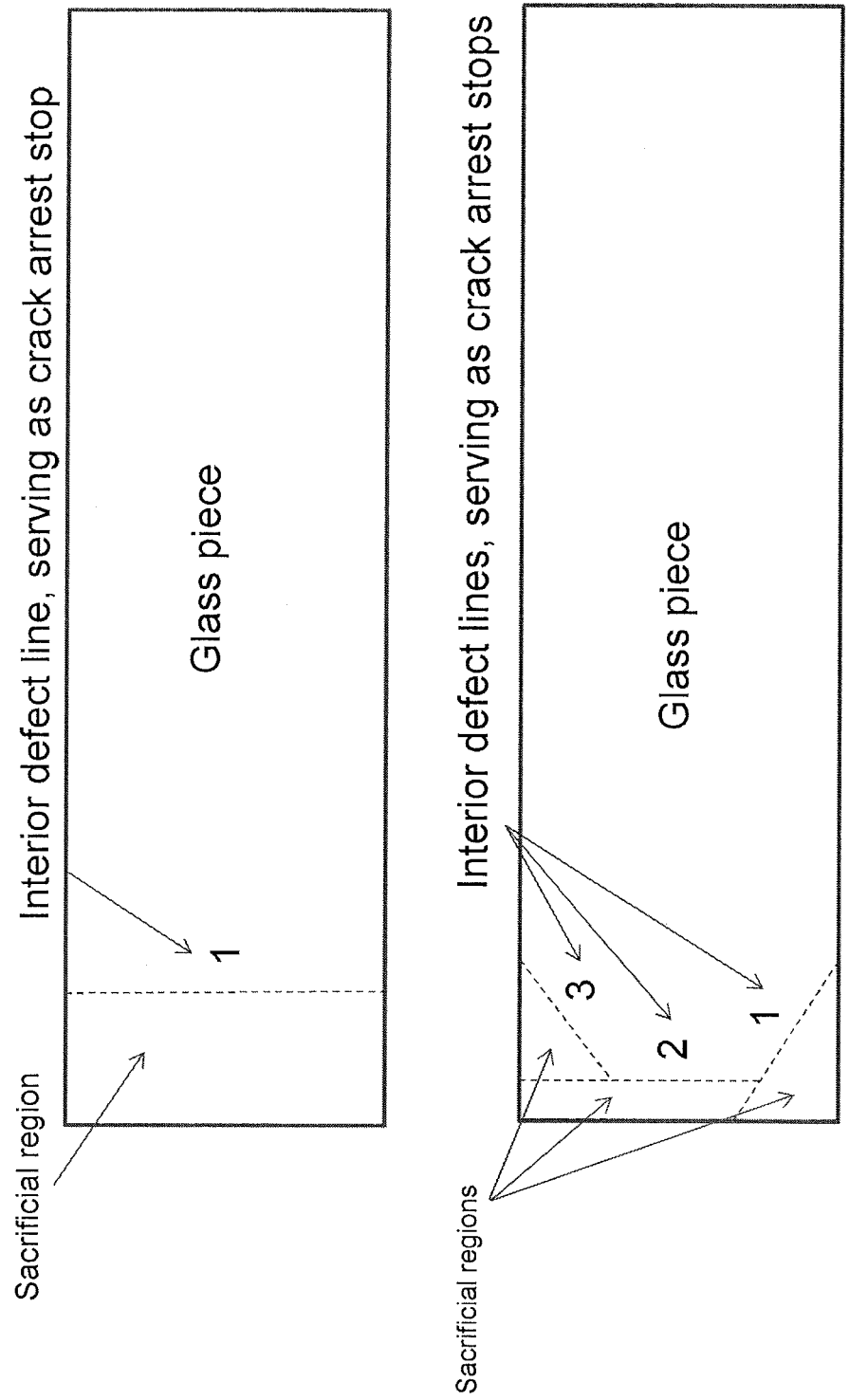
FIG. 13 illustrates using defect lines which remain after the cut part is released to serve as sacrificial regions, arresting the propagation of cracks caused by impact to the edges of the part.

Sacrificial Edges:

Even if the peeled glass does not entirely follow the defect line plane, the presence of the residual defect line inside the glass can be beneficial because it may arrest the propagation of cracks that form when the edge is impacted. In this case, the residual interior defect line planes can be used to serve as damage arrest locations, in effect creating a "sacrificial" edge part of the region of substrate material that is on the surface side of the residual interior defect lines. In fact, creation of sacrificial edges that include a residual interior defect line on the interior side of the separated edge (or a set of residual interior defect lines that intersect to form a more complex interior bevel inside of the true edge), may be a method of improving the reliability of the chamfered part without the need for a physical chamfer feature on the outside edge of the part and without the mechanical grinding and polishing needed to create that feature. Some options for this type of sacrificial edge are shown in FIG. 13. Since the picosecond laser process described above creates each defect line in a single pass and at speeds of up to 1 m/s, it is very easy and cost-effective to create extra "damage stop" lines. When subjected to stress, for example an impacting force, the glass will separate along the sacrificial edge and prevent cracks from the impact from propagating into the interior of the part, thus leaving the balance of the part intact.

Chamfer Method 3:

Finally, separation of the outside glass edge pieces formed by the defect lines need not be done by application of the $CO_2$ laser or application of mechanical force. In many instances, the glass part separated from a glass substrate is sent for chemical strengthening in an ion exchange process. Ion exchange itself can create enough stress to prompt peeling or separation at the chamfer regions or corners of the part. The introduction of new ions into the glass surface can create enough stress to cause the outside corner pieces to peel or separate. In addition, the high temperature salt bath used in the ion exchange process can provide thermal stress sufficient to induce peeling or separation along the fault line to provide a chamfered or otherwise shaped edge. In either case, the ultimate result is an edge that more closely follows the interior defect lines to form the desired chamfer shape see FIG. 14).

Additionally or alternatively, etching of the part in an acid solution (e.g., a solution of 1.5 M HF and 0.9 M $H_2SO_4$) can create enough stress to cause the outside corner pieces to peel or separate.

The chambering methods described herein can also be applied to Corning® Eagle XG® (with the exception of the methods including ion exchange) glass as described in application entitled Laser Cutting of Display Glass Compositions (U.S. Provisional Patent Application Ser. No. 62/023,471).

The methods described above provide the following benefits that may translate to enhanced laser processing capabilities and cost savings and thus lower cost manufacturing. In the current embodiment, the cutting and chamfering processes offer:

Chamfering or fully cutting parts with chamfered edges: the disclosed method is capable of completely separating/cutting Gorilla® Glass and other types of transparent glasses (strengthened or unstrengthened) in a clean and controlled fashion. Full separation and/or edge chamfering were demonstrated using several methods. With Chamfer Method 1, the part is cut to size or separated from glass matrix with a chamfered edge and, in principle, no further post processing is required. With Chamfer Method 2, the part is already cut to size with pre-existing flat edges and the laser is used to chamfer the edges.

Reduced subsurface defects: with Chamfer Method 1, due to the ultra-short pulse interaction between laser and material, there is little thermal interaction and thus a minimal heat affected zone that can result in undesirable stress and microcracking. In addition, the optics that condenses the laser beam into the glass creates defect lines that are typically 2 to 5 microns diameter on the surface of the part. After separation, the subsurface damage can be as low as <30 μm. This has great impact on the edge strength of the part and reduces the need to further grind and polish the edges, as these subsurface damages can grow and evolve into microcracks when the part is submitted to tensile stress and weaken the strength of the edge.

Process cleanliness: Chamfer Method 1 is capable of chamfering glass in a clean and controlled fashion. It is very problematic to use conventional ablative processes for chamfering because they generate a lot of debris. Such ablation-generated debris is problematic, because it can be hard to remove even with various cleaning and washing protocols. Any adhered particulates can cause defects for later processes where the glass is coated or metalized to create thin film transistors, etc. The characteristics of the laser pulses and the induced interactions with the material of the disclosed method avoid this issue because they occur in a very short time scale and the material transparency to the laser radiation minimizes the induced thermal effects. Since the defect line is created within the object, the presence of debris and adhered particles during the cutting step is virtually eliminated. If there are any particulates resulting from the created defect line, they are well contained until the part is separated.

Elimination of Process Steps

The process to fabricate glass plates from the incoming glass panel to the final size and shape involves several steps that encompass cutting the panel, cutting to size, finishing and edge shaping, thinning the parts down to their target thickness, polishing, and even chemically strengthening in some cases. Elimination of any of these steps will improve manufacturing cost in terms of process time and capital expense. The presented method may reduce the number of steps by, for example:

Reduced debris and edge defects generation—potential elimination of washing and drying stations Cutting the sample directly to its final size with shaped edges, shape and thickness-reducing or eliminating need for mechanical finishing lines and a huge non-value added cost associated with them.

The relevant teachings of all patents, published applications and references cited herein are incorporated by reference in their entirety.

While exemplary embodiments have been described herein, it will be understood by those skilled in the art that various changes in form and details may be made therein without departing from the scope of the invention encompassed by the appended claims.

What is claimed is:

1. A method of laser processing comprising:
focusing a pulsed non-diffractive laser beam into a laser beam focal line;
directing the laser beam focal line into a material at a first angle of incidence to the material, the laser beam focal line generating an induced absorption within the material, the induced absorption producing a defect line along the laser beam focal line within the material;
translating the material and the laser beam relative to each other, thereby forming a plurality of defect lines along a first plane at the first angle within the material;
directing the laser beam focal line into the material at a second angle of incidence to the material different from the first angle of incidence, the laser beam focal line generating an induced absorption within the material, the induced absorption producing a defect line along the laser beam focal line within the material;
translating the material or the laser beam relative to one another, thereby forming a plurality of defect lines along a second plane at the second angle within the material, the second plane intersecting the first plane; and
separating the material along the first plane and the second plane by creating thermal stress by:

directing an infrared (IR) laser beam over the plurality of defect lines along the first plane at the first angle within the material; and directing the infrared laser beam over the plurality of defect lines along the second plane at the second angle within the material.

2. The method of claim 1, wherein the directing the laser beam focal line into the material at a first angle of incidence to the material is directed to a first surface of the material and the directing the laser beam focal line into the material at a second angle of incidence to the material is directed to a second surface of the material.

3. The method of claim 1, wherein the material separates along the first plane and the second plane to define a chamfered edge.

4. The method of claim 1, wherein the first plane and the second plane each define a sacrificial edge within the material.

5. The method of claim 1, wherein the IR laser beam is a $CO_2$ laser beam.

6. The method of claim 1, wherein the IR laser beam is defocused.

7. The method of claim 1, further comprising:
directing the laser beam focal line into the material at a third angle of incidence to the material, the laser beam focal line generating an induced absorption within the material, the induced absorption producing a defect line along the laser beam focal line within the material; and
translating the material and the laser beam relative to each other, thereby forming a plurality of defect lines along a third plane at the third angle within the material;
wherein at least two of the first plane, second plane, and third plane intersect.

8. The method of claim 7, wherein the material separates along the first plane, the second plane, and the third plane to define a chamfered edge.

9. The method of claim 7, wherein the first plane, the second plane, and the third plane each define a sacrificial edge within the material.

10. The method of claim 7, further comprising separating the material along the third plane by
directing the infrared laser beam over the plurality of defect lines along the third plane at the third angle within the material.

11. The method of claim 10, wherein the infrared laser beam is a defocused $CO_2$ laser beam.

12. The method of claim 7, wherein one of the first angle, second angle, and third angle is perpendicular to a surface of the material.

13. The method of claim 1, wherein the pulse duration of the pulsed laser beam is in a range of between greater than about 1 picosecond and less than about 100 picoseconds.

14. The method of claim 13, wherein the pulse duration of the pulsed laser beam is in a range of between greater than about 5 picoseconds and less than about 20 picoseconds.

15. The method of claim 1, wherein a repetition rate of the laser is in a range of between about 1 kHz and 2 MHz.

16. The method of claim 15, wherein the repetition rate of the laser is in a range of between about 10 kHz and 650 kHz.

17. The method of claim 1, wherein the pulsed laser beam has an average laser power measured at the material greater than 40 µJ per mm thickness of material.

18. The method of claim 1, wherein the pulses are produced in bursts of at least two pulses separated by a duration in a range of between about 1 nsec and about 50 nsec, and the burst repetition frequency is in a range of between about 1 kHz and about 650 kHz.

19. The method of claim 18, wherein the pulses are separated by a duration of about 20 nsec.

20. The method of claim 1, wherein the pulsed laser beam has a wavelength and the material is substantially transparent at the wavelength.

21. The method of claim 1, wherein the laser beam focal line has a length in a range of between about 0.1 mm and about 100 mm.

22. The method of claim 21, wherein the laser beam focal line has a length in a range of between about 0.1 mm and about 10 mm.

23. The method of claim 22, wherein the laser beam focal line has a length in a range of between about 0.1 mm and about 1 mm.

24. The method of claim 1, wherein the laser beam focal line has an average spot diameter in a range of between about 0.1 µm and about 5 µm.

25. The method of claim 1, wherein the material comprises chemically strengthened glass.

26. The method of claim 1, wherein the material comprises non-strengthened glass.

27. The method of claim 1, wherein focusing the pulsed non-diffractive laser beam into a laser beam focal line comprises directing the pulsed non-diffractive laser beam through an optical arrangement including a first optical element comprising a non-spherical free surface.

28. The method of claim 27, wherein the first optical element comprises a conical prism or axicon.

29. The method of claim 27, wherein the optical arrangement further comprises a focusing optical element positioned at a distance Z1 from the first optical element.

30. The method of claim 29, wherein the focusing optical element comprises a lens with a convex surface.

31. The method of claim 1, wherein the pulsed non-diffractive laser beam is chosen from Bessel, Airy, Weber, and Mathieu beams.

32. A method of laser processing a material comprising:
focusing a pulsed non-diffractive laser beam into a laser beam focal line;
forming a plurality of defect lines along each of N planes within the material, the forming plurality of defect lines including:
(a) directing the laser beam focal line into the material at an angle of incidence to the material corresponding to one of the N planes, the laser beam focal line generating an induced absorption within the material, the induced absorption producing a defect line along the laser beam focal line within the material;
(b) translating the material and the laser beam relative to each other, thereby forming the plurality of defect lines along the one of the N planes; and
(c) repeating (a) and (b) for each of the N planes;
wherein each of the N planes has a unique corresponding angle of incidence different from the other corresponding angles of incidence; and
separating the material along each of the N planes by directing an infrared laser beam over the plurality of defect lines along each of the N planes within the material.

33. The method of claim 32, wherein focusing the pulsed non-diffractive laser beam into a laser beam focal line comprises directing the pulsed non-diffractive laser beam through an optical arrangement including a first optical element comprising a non-spherical free surface.

34. The method of claim 33, wherein the first optical element comprises a conical prism or axicon.

35. The method of claim 33, wherein the optical assembly further comprises a focusing optical element positioned at a distance Z1 from the first optical element.

36. The method of claim 35, wherein the focusing optical element comprises a lens with a convex surface.

37. The method of claim 32, wherein the pulsed non-diffractive laser beam is chosen from Bessel, Airy, Weber, and Mathieu beams.

* * * * *

UNITED STATES PATENT AND TRADEMARK OFFICE
CERTIFICATE OF CORRECTION

PATENT NO. : 10,442,719 B2
APPLICATION NO. : 14/530410
DATED : October 15, 2019
INVENTOR(S) : Sasha Marjanovic et al.

It is certified that error appears in the above-identified patent and that said Letters Patent is hereby corrected as shown below:

On the Title Page

In Column 2, item (56), Other Publications, Line 1, delete "lanugage" and insert -- language --, therefor.

On page 4, in Column 1, item (56), Foreign Patent Documents, Line 25, delete "10/2002" and insert -- 02/2004 --, therefor.

On page 4, in Column 2, item (56), Foreign Patent Documents, Line 44, below "JP 2006248885 9/2006" delete "JP 2006248885 A 9/2006".

On page 5, in Column 2, item (56), Other Publications, Line 16, delete "Diffractivephase" and insert -- Diffractive phase --, therefor.

On page 6, in Column 1, item (56), Other Publications, Line 33, delete "pluse" and insert -- pulse --, therefor.

On page 6, in Column 2, item (56), Other Publications, Line 68, delete "Culling" and insert -- Cutting --, therefor.

On page 7, in Column 2, item (56), Other Publications, Lines 26-27, delete "Eelectropolishing;" and insert -- Electropolishing; --, therefor.

Signed and Sealed this
Eighteenth Day of February, 2020

Andrei Iancu
*Director of the United States Patent and Trademark Office*